United States Patent [19]

Bamford

[11] Patent Number: 5,596,382

[45] Date of Patent: *Jan. 21, 1997

[54] IMPACT ACTIVATED TRIGGERING MECHANISM FOR A CAMERA MOUNTED ANYWHERE IN A VEHICLE

[75] Inventor: Robert M. Bamford, Glendale, Calif.

[73] Assignee: Terry D. Scharton, Santa Monica, Calif.; a part interest

[ * ] Notice: The term of this patent shall not extend beyond the expiration date of Pat. No. 5,568,211.

[21] Appl. No.: 541,203

[22] Filed: Oct. 16, 1995

Related U.S. Application Data

[63] Continuation-in-part of Ser. No. 419,092, Apr. 10, 1995.

[51] Int. Cl.$^6$ .............................. G03B 17/38; G03B 29/00
[52] U.S. Cl. ............................................. 396/429; 396/502
[58] Field of Search .............................. 354/76, 81, 266, 354/293, 295, 288; 352/132, 174

[56] References Cited

U.S. PATENT DOCUMENTS

| | | |
|---|---|---|
| 2,876,688 | 3/1959 | Laue ........................................ 352/132 |
| 2,879,349 | 3/1959 | Thompson . | |
| 2,888,530 | 5/1959 | Horton . | |
| 3,332,060 | 7/1967 | Liljequist . | |
| 3,407,667 | 10/1968 | Doeringsfeld . | |
| 3,515,472 | 6/1970 | Schwitzgebel ........................... 352/132 |
| 3,833,196 | 9/1974 | Protzman ................................ 354/293 |
| 3,836,738 | 9/1974 | Baland . | |
| 5,011,182 | 4/1991 | Husby et al. . | |
| 5,134,255 | 7/1992 | Tetrault et al. . | |
| 5,246,193 | 9/1993 | Faidley ................................... 354/293 |
| 5,262,813 | 11/1993 | Scharton ............................... 354/266 |

*Primary Examiner*—A. A. Mathews
*Attorney, Agent, or Firm*—Thomas I. Rozsa; Tony D. Chen

[57] ABSTRACT

An impact activated camera triggering apparatus is used in combination with a camera wherein the apparatus can be mounted on any window of a vehicle having a field of view. The apparatus has an impact activated triggering mechanism which responds to inertial forces from any horizontal direction. Upon sudden impact or deceleration an enclosed inertia member moves relative to the camera causes the release of a spring which directly or indirectly actuates the shutter on the camera.

40 Claims, 11 Drawing Sheets

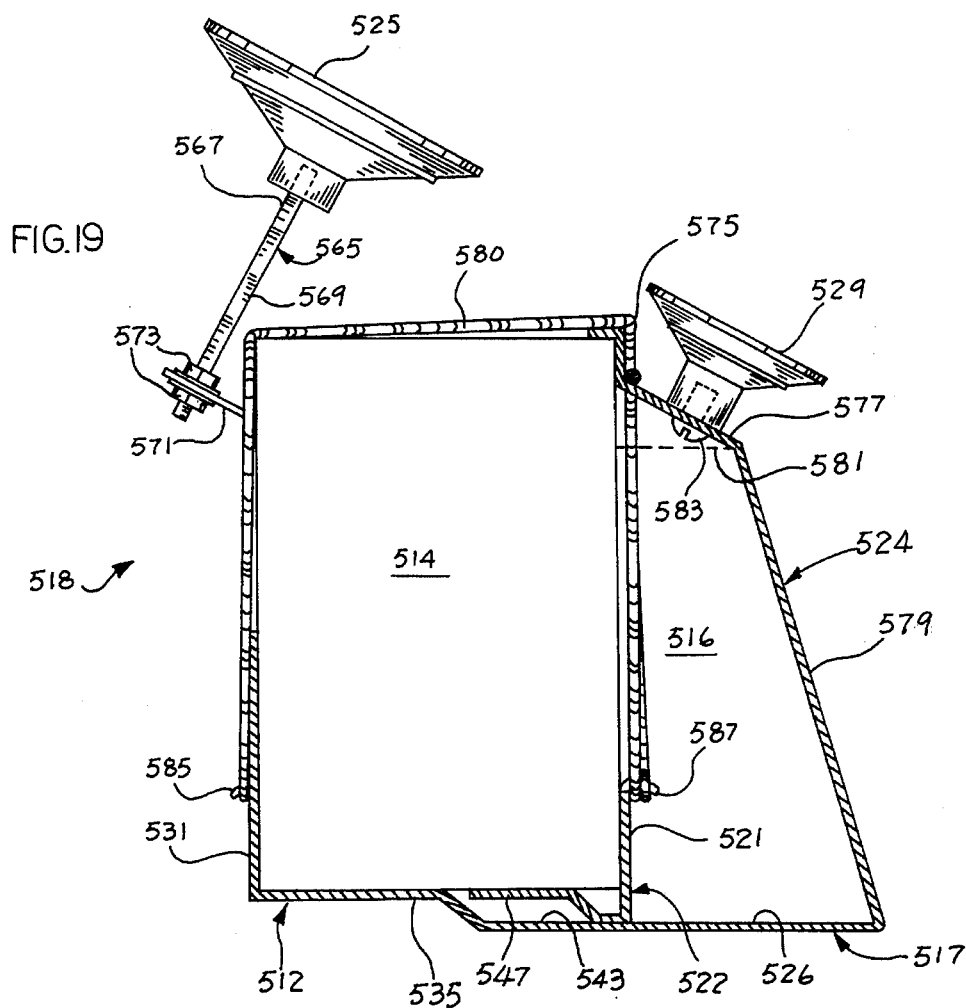
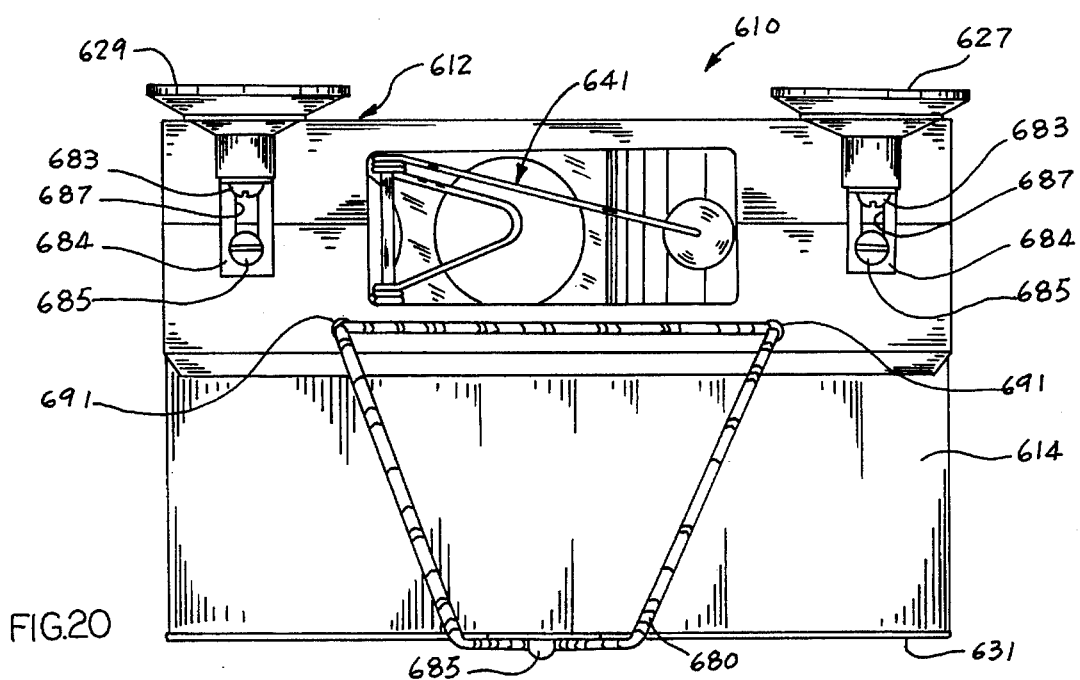

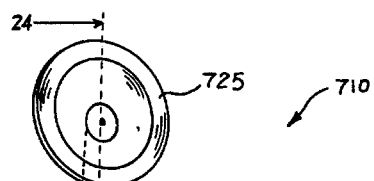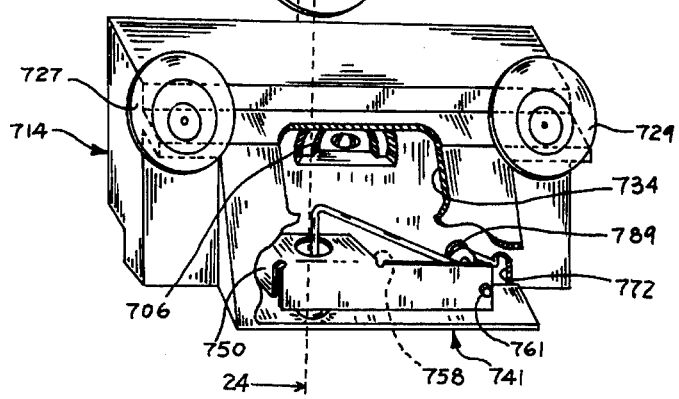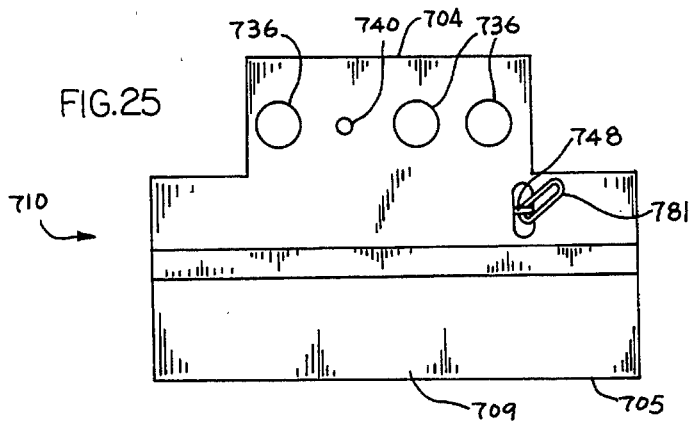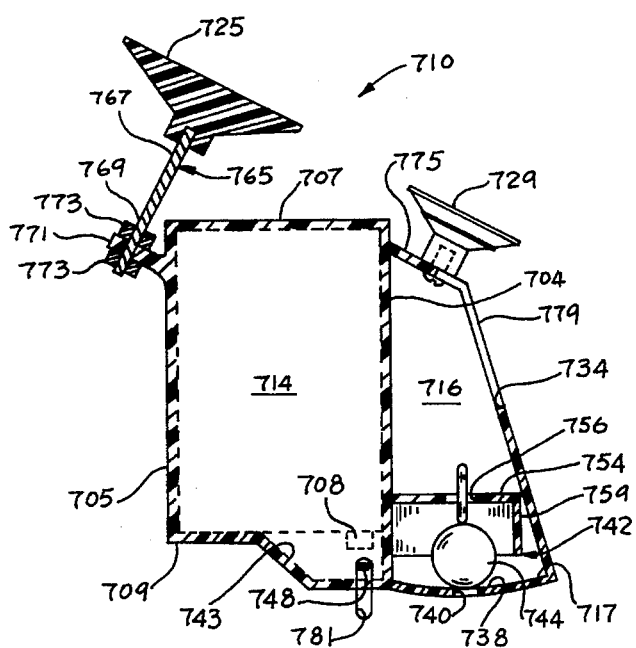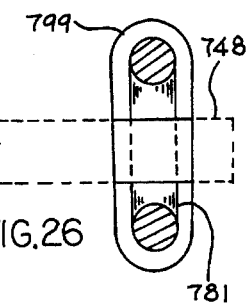

IMPACT ACTIVATED TRIGGERING MECHANISM FOR A CAMERA MOUNTED ANYWHERE IN A VEHICLE

This application is a Continuation-In-Part of patent application Ser. No. 08/419,092 filed on Apr. 10, 1995.

BACKGROUND OF THE INVENTION

1. Field of the Invention

The present invention relates to the field of cameras. More particularly, the present invention relates to an impact activated triggering mechanism for a conventional disposable camera mounted on a rear-view mirror of a vehicle. In particular, the present invention relates to an impact activated camera triggering apparatus used in combination with a conventional disposable camera wherein the apparatus can be mounted in the vehicle at any point with a field of view.

2. Description of the Prior Art

Generally, when taking a picture, personal attention is required to take a photographic picture of an object. When a vehicle collision occurs, there is almost no way for a driver to manually take a picture at the instant an accident has occurred. An impact actuated switch is required to trigger a camera.

In the prior art inertial switch category, various devices employ spring biased movable masses to open or close an electrical circuit or do mechanical work when the device is subjected to an acceleration. The typical impact sensor utilizes a movable mass that is biased to a normal position by compressed springs or magnetic attraction. The movable mass is often in the form of a spherical metal ball and is constrained to move through a closed chamber against the restraining force of the biasing means upon the chamber receiving a force from the proper direction.

The following seven (7) prior art patents were uncovered in the pertinent field of the present invention:

1. U.S. Pat. No. 2,879,349 issued to Thompson on Mar. 24, 1959 for "Safety Switch" (hereafter "the Thompson patent");

2. U.S. Pat. No. 2,888,530 issued to Horton on May 26, 1959 for "Impact Responsive Camera For Automobiles" (hereafter "the Horton patent");

3. U.S. Pat. No. 3,332,060 issued to Liljequist on Jul. 18, 1967 for "Vehicle Deceleration Signalling Apparatus" (hereafter "the Liljequist patent");

4. U.S. Pat. No. 3,407,667 issued to Doeringsfeld on Oct. 29, 1968 for "Omnidirectional Inertial Trigger Apparatus" (hereafter "the Doeringsfeld patent");

5. U.S. Pat. No. 3,836,738 issued to Baland on Sep. 17, 1974 for "Impact Switch With Inertia Operated Toggle Linkage Actuator Mechanism" (hereafter "the Baland patent");

6. U.S. Pat. No. 5,011,182 issued to Husby et al. on Apr. 30, 1991 for "Velocity Change Sensor With Contact Retainer" (hereafter "the Husby patent"); and 7. U.S. Pat. No. 5,134,255 issued to Tetrault et al. on Jul. 28, 1992 for "Miniature Acceleration Switch" (hereafter "the Tetrault patent").

The Thompson Patent discloses an electrical safety switch. The safety switch serves to interrupt an electrical circuit in a vehicle, airplane or the like, in the event of an accident or impact. The safety switch includes a movable metal ball which is adapted to be moved from a predetermined position upon impact so that the electrical circuit will be interrupted.

The Horton patent discloses a switch of impact type in an electrical circuit. It includes a base of a dielectric material, a permanent magnet which is a horse-shoe design, a steel ball, and a dish with the steel ball located within the dish. The steel ball is kept between the poles of the permanent magnet by the magnetic field between the poles. The magnetic attraction of the steel ball to the poles is intense enough to hold the steel ball in place. Upon impact, the steel ball would be thrown from its position in the center of the dish against the ring encircling the dish, and therefore the steel ball would be in contact with both the dish and the ring. The steel ball contacting both the dish and the ring would close the circuit. The intended, but not claimed, application of this device is the operation of a camera mounted in a vehicle. The switch would energize an electrical circuit causing an electromagnet to depress the push-button of the camera which actuates the shutter in the camera. The switch is mounted remotely from the camera which is mounted in back of the vehicle.

The Liljequist patent discloses an inertia actuated electrical switching device and system responsive to changes in deceleration of a vehicle for varying the amount of light emitted from its rear warning lights. The deceleration sensitive arrangement is used to vary the current flow in an electrical circuit, which is a type utilizing a relatively freely movable mass forming an electrical bridge between two terminals in the circuit. The electrical circuit includes an elongated track, a mass being bias movable relative thereto in response to changes in velocity, and electrical resistance arranged so as to vary the electrical resistance interposed in the circuit dependent upon the relative position between the track and the mass.

The Doeringsfeld patent discloses an omnidirectional acceleration sensor that will provide a unidirectional mechanical output. It includes a frame, a pivot pin, an arm member, a coil spring, and a spherical ball in a cup. When an upward inertial force is received, the spherical ball will tend to remain fixed as the frame moves away from it. The spherical ball will force the arm member to pivot about the pivot pin in a clockwise direction. Similarly, a lateral force causes the ball to move out of the cup so that the arm pivots. The inertial force results in a mechanical movement of both ends of the arm member that can be utilized to perform useful work. The device is specially designed for a munitions fuse.

The Baland patent discloses an inertia switch assembly utilized with an electrical circuit. The inertia responsive switch includes an over center linkage system, switch terminals operatively arranged with the linkage system and effective to move between open and closed positions, and an inertia member operatively connected to the linkage system so as to effectuate an opening or closing of the switch terminals when the inertia responsive member moves relative to the linkage system upon impact or high deceleration of the switch. The switch is sensitive to uniaxial impacts. The switch closes to complete a circuit effective to actuate a transmitter that emits a signal. The switch has special utility in an automatic crash signal device for aircraft.

The Husby patent discloses a velocity change sensor with a contact retainer. It relates to an accelerometer for sensing velocity changes particularly suited for passenger restraint systems in a motor vehicle for deploying an air bag. It includes a housing with contact blades and a contacting element. The contacting element is arranged to move toward the contact blades when a deceleration exceeding a threshold level is sensed. The contact retainer is provided to set the blades in a preselected position so that the blades are simultaneously contacted by the contacting element, thereby improving the response time of the accelerometer. The contact blades are serially connected in an electrical circuit which comprises a battery and an actuating mechanism. The actuating mechanism controls and deploys one or more air bags.

The Tetrault patent discloses a miniature acceleration activated electrical switch. It relates to electrical acceleration activated switches which have a mass movable in a housing against a spring bias in response to an applied acceleration. The miniature acceleration activated switch is responsive to a relatively small axial acceleration in order to close normally open contacts in the switch, in the presence of large laterally directed accelerations on the switch. It includes a hollow cylindrical casing which is closed at one end and the other end is closed by a header having an insulated axial lead wire extending inwardly from the casing, and an electrically conductive ring secured peripherally to the casing. The casing has an internally conical guide sleeve which has a freely rollable massive ball. A piston in the guide sleeve carries a contact member spaced by an expanded coil spring from the lead wire. The piston moves axially against the spring bias such that the contact member contacts the lead wire to close the normally open circuit switch.

Most of the prior art inertial switch patents are designed for use with an electrical circuit. It will be desirable to eliminate the electrical output and rely entirely upon mechanical functions for impact activated triggering mechanism for a camera.

None of the prior art mechanical inertial switches are desirable for impact triggering of a vehicle camera. Most of the mechanical inertial switches require a very large impact for triggering, such as that associated with munitions or an aircraft impacting the ground at high velocities. Another category of inertial switches, mostly electrical, are designed to activate automobile air bags upon severe impacts. These are particularly designed to operate above some high threshold and to avoid false alarms. A vehicle camera trigger should be sensitive to less severe impacts.

The major design problem for a mechanical inertial trigger for a vehicle camera is that the trigger must provide a relatively large actuation force (in excess of one half pound is required to depress the camera shutter release button), but must be capable of activation by relatively low impact loads from any lateral direction on the order of less than one ounce.

In addition, a vehicle camera mechanical impact activated trigger should be designed for convenient location and mounted in the vehicle to facilitate service and manual operation by the vehicle occupants, while not interfering with other vehicle operations and uses.

One of the assignees of the present invention is the patentee of U.S. Pat. No. 5,262,813 issued to Scharton on Nov. 16, 1993 (hereafter "the '813 patent"). The '813 patent discloses an impact activated triggering mechanism for a camera mounted in a vehicle. The '813 patent introduced a sliding motion for triggering of a camera which occurs in a high intensity impact. The impact is sensed by a sliding weight which is configured so that the deceleration or acceleration applied in any direction in a horizontal plane will move the camera relative to the sliding weight and trigger the camera.

The inventor of the present invention has made significant improvements on the '813 patent, in which are as follows: (a) implementations have been identified which provide for more reliable operation when a desired acceleration threshold is exceeded and which reliably maintain the untriggered configuration when the desired acceleration threshold is not exceeded thus preventing incremental inadvertent triggering; (b) means of replacing the sliding motion with rolling motion to make the device more sensitive and repeatable due to less dependence on uncertain environment dependent coefficients of friction for low intensity impact, while sliding occurs for higher intensity impacts, have been defined; (c) means to make re-cocking easier have been defined; (d) means of alignment independent of the mirror back surface shape have been defined; (e) means of integrating the triggering mechanism with the mechanism of a camera have been defined; and (f) details of designs which minimize obstruction of the driver's view, provide chimney effect cooling, protect the camera mechanism from damage following triggering, provide an integral lens shield and enclose functional components for improved appearance have been described.

SUMMARY OF THE INVENTION

The present invention is an improved impact activated camera triggering apparatus for a vehicle. Many times accidents occur without any witnesses around, and oftentimes each driver blames the other for the accident. The objective of the present invention is to provide means to operate a conventional disposable camera, whereby a photographic picture will be taken automatically when a vehicle collision occurs.

The preferred embodiment of the present invention is a mechanical inertial triggering mechanism which is mounted within a mounting case. A conventional disposable wide-angle camera is placed inside the mounting case where the mounting case is removably attached to a rear-view mirror of a vehicle.

The present invention is capable of providing an actuation force in excess of half (½) a pound which is the force required to depress the shutter release button lever of commercially available disposable cameras. Yet the device is sensitive to small (threshold less than 4 g's) accelerations or decelerations in any lateral direction (where "g" is a standard unit equal to the free fall acceleration due to the earth's gravity: $g \approx 9.8$ m/s$^2$). The impact activated triggering mechanism will be responsive to a low intensity sudden impact from another vehicle, but will normally remain inactive during average jostling and jarring of the vehicle due to the road condition.

It is therefore an object of the present invention to provide an impact activated camera triggering apparatus which includes a mounting case, an impact activated triggering mechanism for use with a disposable camera, so that the impact activated triggering mechanism can be responsive to a low intensity sudden impact such as the one produced by a minor collision between two vehicles.

It is also an object of the present invention to provide an impact activated camera triggering apparatus without using electrical circuits, so that it can rely entirely upon mechanical functions for operating a camera.

It is an additional object of the present invention to provide an impact activated camera triggering apparatus which includes a mounting case for a disposable camera, in which the mounting case is removably mounted on a rearview mirror of a vehicle so that the camera can record a collision, traffic light status, license plate, and the position of the vehicles relative to each other and the road, essentially at the instant of the collision. The camera will also be accessible for conventional manual operation.

It is a further object of the present invention to provide an impact activated camera triggering apparatus which utilizes a rolling motion in lieu of a sliding motion where practical, so that the sensitivity and reliability of the impact activated triggering mechanism is increased.

It is an additional object of the present invention to provide a mounting case which has means for indexing to the mirror side of a rear-view mirror, so that the angle of the mounting case is always preadjusted when clamped to the rear-view mirror independent to the shape of the back of the mirror.

It is also an object of the present invention to provide a long narrow soft tapering trigger spring which has a tapered width, which is widest in the middle and narrowest at its opposite ends, so that when the spring is pivoted at its middle point, the bending stress is uniformly distributed along the entire length of the trigger spring.

It is a further object of the present invention to provide a long narrow soft tapering trigger spring which actuates the tip of the shutter release button lever of a camera, so that less pressure is utilized and a stop is included which prevents damage to the shutter release button lever.

It is still a further object of the present invention to provide a single finger thrust reset mechanism, so that the impact activated triggering mechanism can be reset with a push of a button.

Described briefly, the present invention impact activated camera triggering apparatus incorporates the following five elements: (1) a trigger spring whose release actuates a visual image recording device; (2) a seismic mass; (3) means for supporting the seismic mass which prevents motion of the seismic mass relative to the support in the absence of a horizontal acceleration of the support exceeding a threshold value; (4) a device which releases the trigger spring when the support moves horizontally relative to the seismic mass; and (5) means for supporting the assembly of the first four elements and a visual image recording device in a preset orientation such that the recording device views a scene to be recorded when the acceleration occurs.

Elements 1 through 4 can be internal or external to the visual image recording device. The seismic mass can be in one or more pieces. The seismic mass can move relative to its support by a sliding motion or a rolling motion or a combination of the two motions. The seismic mass and release mechanism can be positioned for actuation in one or more steps.

It is another object of the present invention to provide an impact activated camera triggering apparatus which comprises a mounting element for retaining a disposable camera therein, in which the mounting element is removably mounted on almost any window surface of a vehicle having a field of view, so that the camera can record a collision, traffic light status, license plate, and the position of the vehicles relative to each other and the road, essentially an the instant of the collision.

It is also another object of the present invention to provide an impact activated camera triggering apparatus which comprises a mounting element having one or more suction cups such that the suction cups are utilized for attaching to any point on a vehicle having a field of view and maintaining the apparatus at the correct angle on the window surface so that the camera can record a collision, traffic light status, license plate, and the position of the vehicles relative to each other and the road, essentially at the instant of the collision.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 19 is a partial cross-sectional view taken along line 19—19 of FIG. 18;

FIG. 20 is a top plan view of still another embodiment of the present invention impact activated camera triggering apparatus;

FIG. 23 is a perspective view of still further another embodiment of the present invention impact activated camera triggering apparatus;

FIG. 24 is a partial cross-sectional view taken along line 24—24 of FIG. 23;

FIG. 25 is a bottom plan view of the present invention impact activated camera triggering apparatus; and FIG. 26 is an enlarged partial bottom section of the pendant of the present invention impact activated camera triggering apparatus, below the bottom of the inverted camera looking up.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
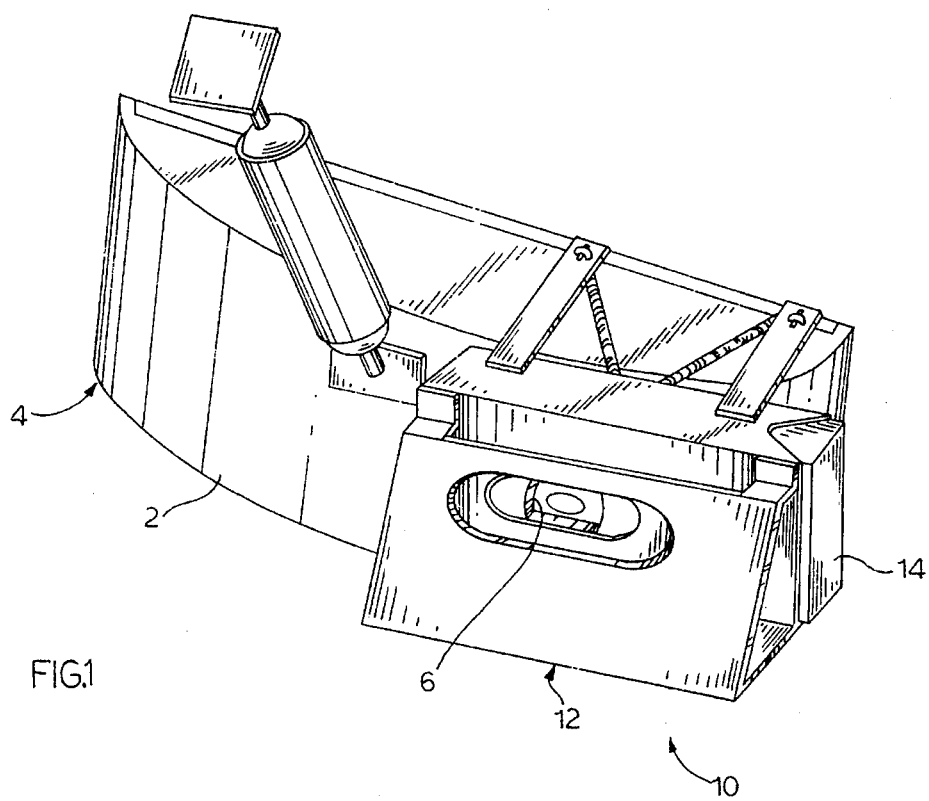
FIG. 1 is a perspective view of the present invention impact triggering camera apparatus removably mounted behind a rear-view mirror of a vehicle.
Figure 5:
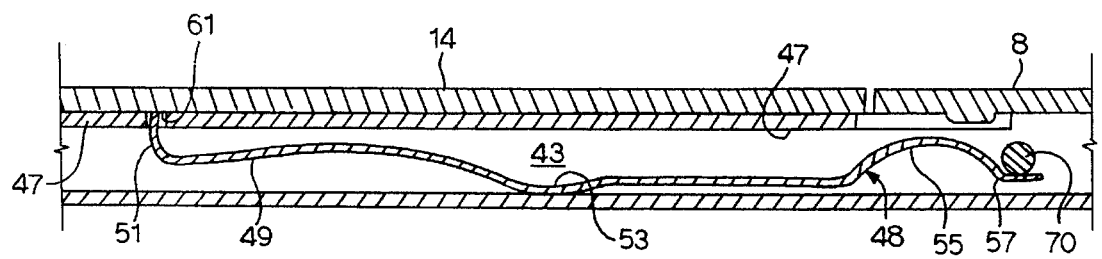
FIG. 5 is a partial cross-sectional view of a long narrow soft tapering trigger spring, showing the trigger spring latched by a transverse latching pin.
Figure 7:
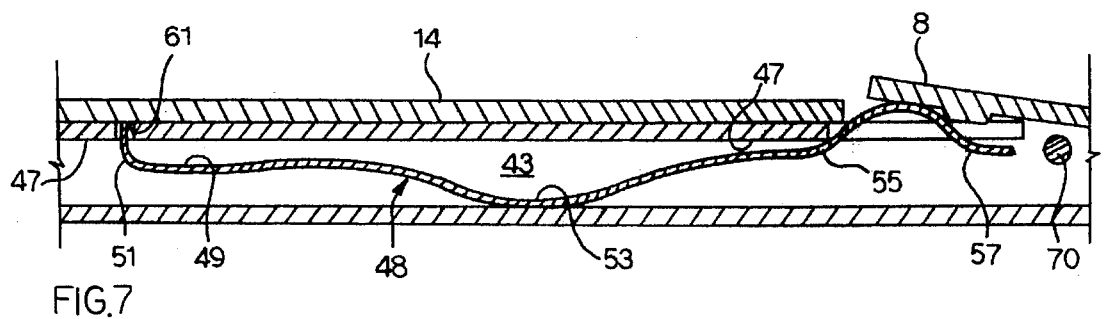
FIG. 7 is a partial cross-sectional view of the tapering trigger spring actuating the shutter release button lever of the camera.

Referring to FIG. 1, there is shown a perspective view of the present invention impact activated camera triggering apparatus 10 which is removably attached inside a vehicle (which may be a truck, a bus, an automobile, or any other type of vehicle) at a location between the back 2 of a rear-view mirror 4 and a front windshield for taking a photographic picture. The apparatus 10 includes a mounting case or means 12 that supports a conventional disposable wide-angle lens camera 14 or any other photographic device. The camera 14 includes conventional parts, e.g., a shutter release button lever 8 (shown in FIGS. 5 and 7), a wide angle lens 6, means for retaining a roll of film, and means to advance the roll of film, such as a thumb wheel, after an exposure and set the shutter for a next shot. The camera 14 may also be a conventional electronic visual image recording device. In either case, a device with a wide angle lens is preferred to enhance the field of view. The camera 14 is inserted within the mounting case 12, in which it slides after being inverted into the mounting case 12 such that the shutter release button lever 8 is pointing downward towards the ground or floor, as shown in FIGS. 5 and 7.

Figure 2:
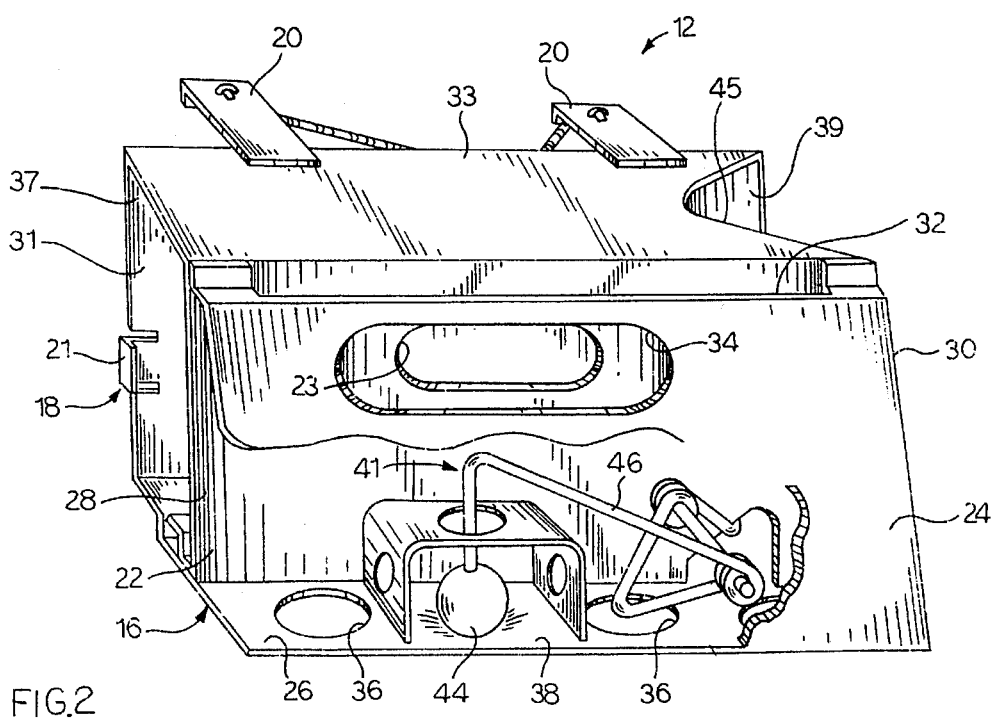
FIG. 2 is a front cutout perspective view of an impact activated triggering mechanism which is assembled in a mounting case.
Figure 8:
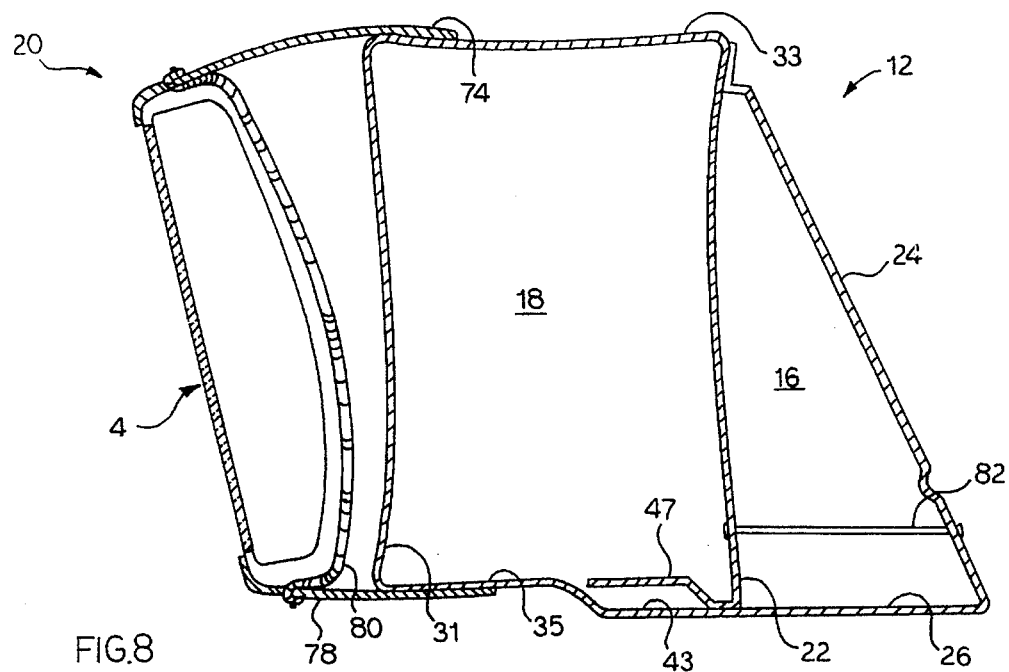
FIG. 8 is a side cross-sectional view of the mounting case and the rearview mirror, showing the front, rear, top and bottom panels of the mounting case curved inwardly.

FIG. 2 shows a front cut-out perspective view of the mounting case 12. FIG. 8 shows a side cross-sectional view of the mounting case 12. Referring to FIGS. 2 and 8, there is shown at 12 the mounting case which includes a generally right triangular shaped front compartment 16, as shown in FIG. 8, which encloses the preferred embodiment of an impact activated triggering mechanism 41, a generally rectangular shaped rear camera compartment 18, and mounting means 20 for mounting behind the rear-view mirror 4 of the vehicle. The mounting case 12 may be made out of aluminum such as, e.g., 6061 T4 or any other suitable type of material.

The front and rear compartments 16 and 18 share a bowed shaped common panel 22 which is the back panel of the front compartment 16 and the front panel of the rear compartment 18. The common panel 22 has an elliptical shaped opening 23 therethrough. The rear compartment 18 includes a bowed shaped back panel 31, a top panel 33, a bottom panel 35, a first end opening 37, and a second end opening 39. The bowed shaped back panel 31 is generally parallel to the bowed shaped common panel 22, where both of the bowed shaped portions of the panels 31 and 22 are facing each other to provide a squeezing effect, as shown in FIG. 8, so that the camera 14 is held within the rear compartment 18, as shown in FIG. 1. The end openings 37 and 39 may have means for preventing the camera 14 from sliding out of the rear compartment 18. The means may be a flange 21 (shown only at end opening 37) which is integrally connected thereon, as shown in FIG. 2. The end opening 39 is utilized for inserting or removing the camera 14 from the mounting case 12 for conventional manual operation. The flange (not shown) at the end opening 39 may be disabled to allow insertion or removal of the camera 14.

Figure 4:
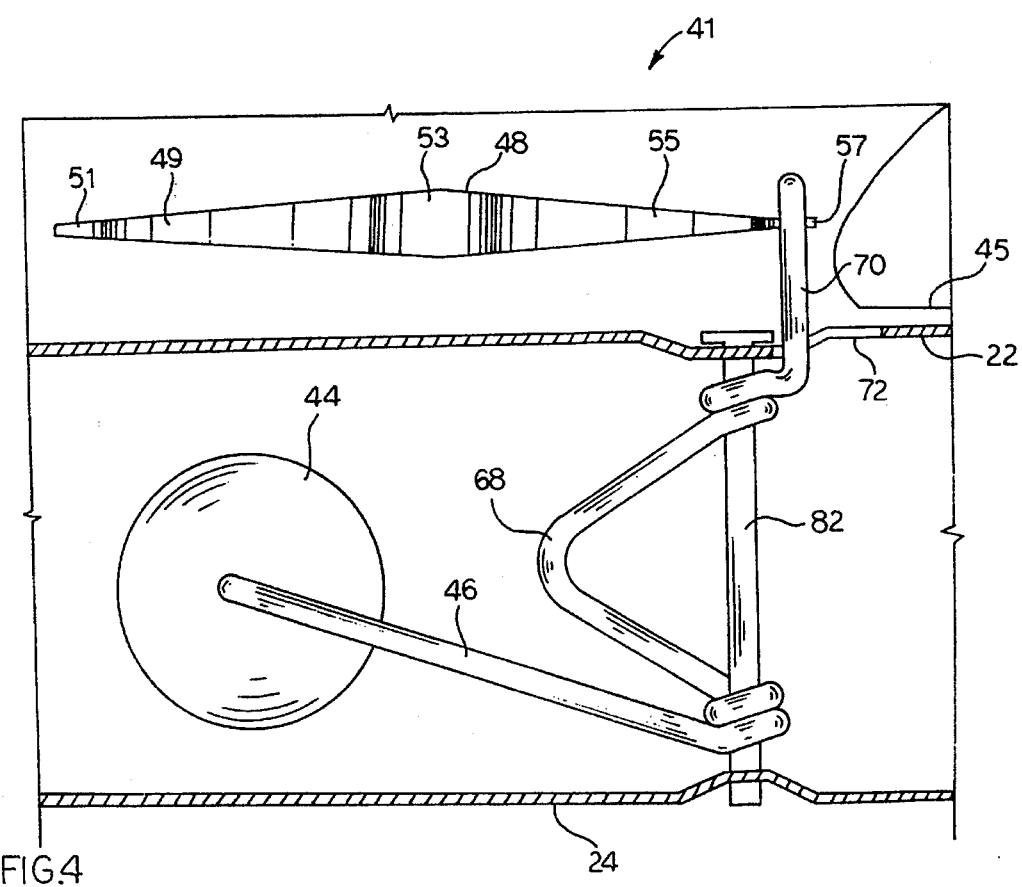
FIG. 4 is a partial top plan view of the impact activated triggering mechanism in the cocked condition.

The top panel 33 and the bottom panel. 35 of the rear compartment 18 each has a generally rounded triangular or half-circle shaped cut-out 45 at the end opening 39 which provides a clearance for the user to use his or her fingers to hold the camera 14 for insertion or removal. The bottom cut-out 45 shown in FIG. 4 is also used for accessing the shutter release button lever 8.

Referring to FIGS. 4, 5, 7 and 8, the bottom panel 35 of the rear compartment 18 has a longitudinal step-down section 43. A longitudinal cover plate 47 is mounted within the step-down section 43 such that it covers the entire step-down section 43 and leaves an open space or gap for mounting a long narrow soft tapering trigger spring 48.

FIG. 5 shows the trigger spring 48 in its cocked position. FIG. 7 shows the trigger spring 48 in its uncocked position where the trigger spring 48 is pressing on the shutter release button lever 8. Referring to FIGS. 4, 5 and 7, the trigger spring 48 comprises a tapering proximal section 49 with a narrow proximal end 51, a wide middle section 53, and a tapering distal section 55 with a narrow distal end 57. The trigger spring 48 is pivoted at its middle point. In this configuration, the bending stress in the trigger spring 48 is relatively uniformly distributed along its length. The two ends 51 and 57 of the trigger spring 48 are extending upwardly while the wide middle section 53 is extending downwardly and abutting against the bottom surface of the step-down section 43, as shown in FIGS. 5 and 7, and provides a preset force on the trigger spring 48 to press the shutter release button lever 8. The proximal end 51 of the trigger spring 48 is anchored to the cover plate 47 by any suitable means, such as for example, the tip of the proximal end 51 enters into a detent hole 61. Rotation about such a detent can be prevented by a guide at the distal end 57. The distal end 57 of the trigger spring 48 protrudes upwardly through an end opening on the cover plate 47 when it is released.

Referring to FIGS. 2 and 8, the front compartment 16 has a slanted front panel 24, a bottom panel 26, a first end opening 28, and a second end opening 30. The slanted front panel 24 has a slotted top end 32 and a centrally located elliptical shaped opening 34 therethrough. The two elliptical shaped openings 34 and 23 of the front and common panels 24 and 22 are respectively aligned and parallel to each other for accommodating the field of view of the wide angle lens of the camera 14, when the camera 14 is installed within the rear compartment 18. The bottom panel 26 of the front compartment 16 has multiple apertures 36 and a detent section 38 which is located between a respective two of the multiple apertures 36. The multiple apertures 36 and the slotted top end 32 provide a chimney effect for cooling the camera 14. The detent section 38 has a central cavity 40 (see FIG. 6) therethrough.

Figure 3:
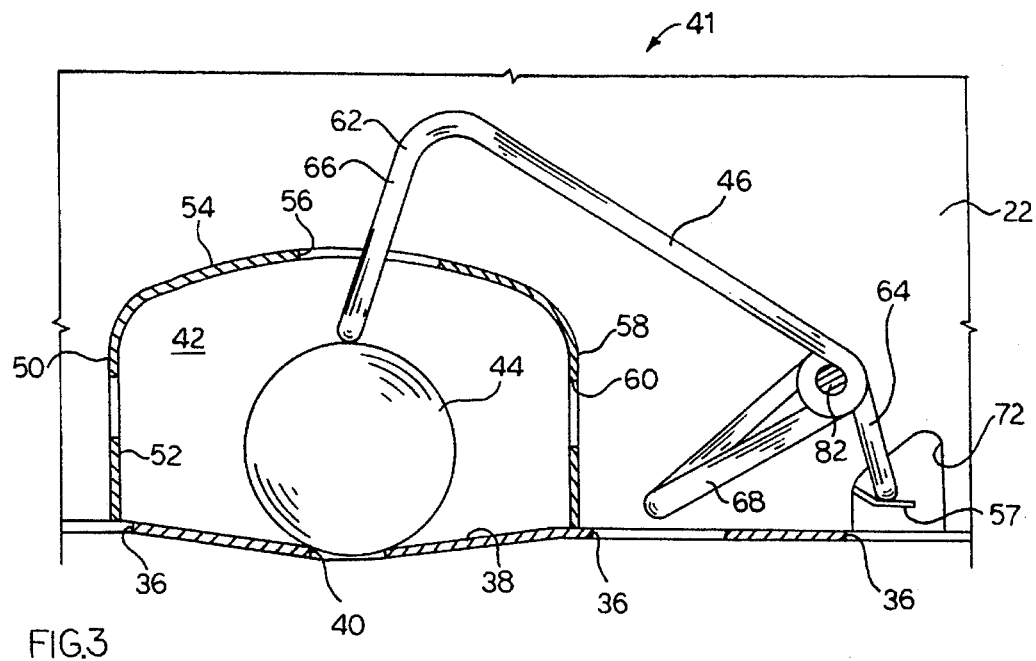
FIG. 3 is a partial cross-sectional view of the impact activated triggering mechanism in the cocked condition, showing a ball chamber where a rolling ball is located.
Figure 6:
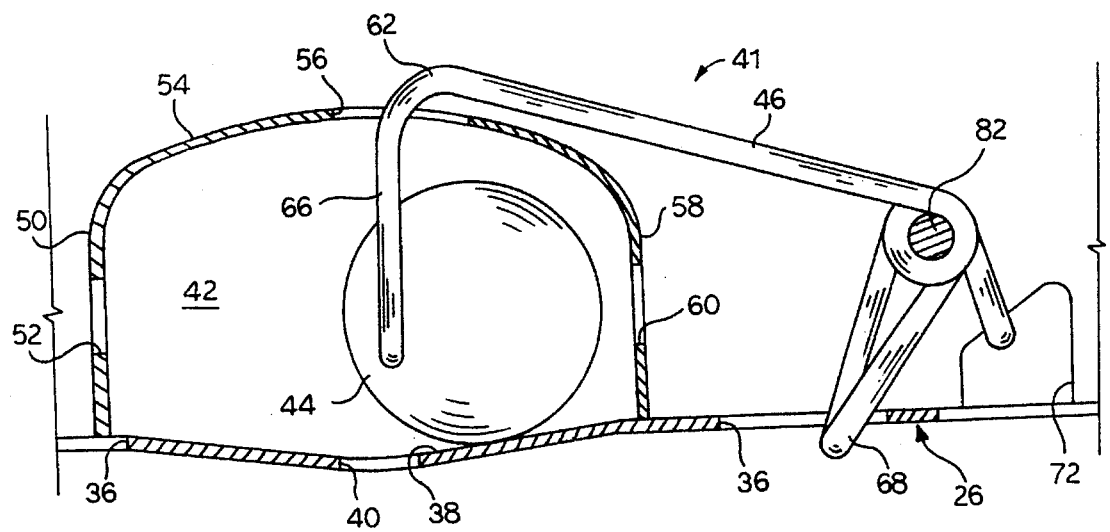
FIG. 6 is a partial cross-sectional view of the impact activated triggering mechanism in the released condition.

FIG. 3 shows a partial cross-sectional view of the impact activated triggering mechanism 41 in its cocked position. FIG. 4 shows a partial top plan view of the impact activated triggering mechanism 41 also in its cocked position. FIG. 6 shows a partial cross-sectional view of the impact activated triggering mechanism 41 in its released or uncocked position. Referring to FIGS. 3, 4 and 6, the impact activated triggering mechanism 41 includes a chamber 42 for retaining a seismic mass 44, a trigger lever arm 46, and the long narrow soft tapering trigger spring 48. The seismic mass 44 is generally a spherical rolling ball. The deceleration or acceleration is associated with a low intensity sudden impact. The low intensity impact is sensed by the rolling ball 44 which is above the central cavity 40 of the detent section 38. The detent section 38 is configured so that the low intensity impact deceleration or acceleration applied in any horizontal direction will move the rolling ball 44 relative to its cocked position. The central cavity 40 defines a threshold horizontal load and prevents inadvertent and incremental triggering.

The chamber 42 has a first end wall 50 with an opening 52, a top wall 54 with a top opening 56, and a second end wall 58 with an opening 60. These parts together with parts of the slanted front panel 24 and the common panel 22 and the entire detent section 38 of the bottom panel 26 of the front compartment 16 form the chamber 42. The rolling ball 44 is placed in and retained within the chamber 42 so that it is limited to a horizontal plane movement and responsive to inertial forces. One of the unique features of the present invention is that the detent section 38 has a conical surface which provides an automatic cocking return mechanism for centering and allowing the rolling ball 44 to be reset in its cocked position.

As shown in FIG. 3, the trigger lever arm 46 has a distal end 62 and a proximal end 64. The distal end 62 forms a trigger lever pin 66 which extends down through the top opening 56 of the chamber 42 and rests on top of the rolling ball 44, as shown in FIGS. 2, 3 and 4. In this position, the impact activated triggering mechanism 41 is cocked and is ready to trigger the camera. When the rolling ball 44 rolls in any horizontal direction off the central cavity 40 of the detent section 38, the trigger lever pin 66 slides off the top of the rolling ball 44. The bottom tip of the trigger lever pin 66 is rounded to prevent premature termination of motion. The proximal end 64 of the trigger lever arm 46 is wrapped around a pivot shaft or axle 82 and forms a reset trigger lever 68 and a transverse latching pin 70. The pivot shaft 82 is mounted transversely between the front panel 24 and the common panel 22 at a location remote from the rolling ball 44. The reset trigger lever 68 rests above one of the multiple apertures 36 and is located outside the chamber 42. The latching pin 70 extends through an opening 72 on the common panel 22 and into the rear compartment 18 for engaging with the distal end 57 of the trigger spring 48. The reset trigger lever 68 is used for facilitating the cocking of the tapering distal section 55 of the trigger spring 48 by latching the transverse latching pin 70 of the trigger lever arm 46 over the narrow distal end 57 of the trigger spring 48 to prevent the tapering distal section 55 from pressing up on the shutter release button lever 8 of the camera 14 prematurely.

The sensitivity and threshold may be varied by changing the diameter of the central cavity 40 of the detect section 38 relative to the diameter of the rolling ball 44. Also, the sensitively and threshold may be varied by changing the weight of the rolling ball 44 relative to the force the spring applies to the lever by varying the horizontal projection of the length of the trigger lever arm 46 relative to the distance from the normal to the trigger spring distal end 57 at the latching pin 70 of the trigger lever arm 46 from the pivot axis.

Cocking is accomplished by first removing the camera 14 from the rear compartment 18 of the mounting case 12 and applying a light downward pressure on the distal section 55 of the trigger spring 48. Secondly, applying a light upward pressure on the reset trigger lever 68 until the latching pin 70 is above and latches the distal end 57 of the trigger spring 48 and the trigger lever pin 66 is above the rolling ball 44. Gravity will allow the rolling ball 44 to settle above the central cavity 40 of the detent section 38. Thirdly, releasing the upward pressure on the reset trigger lever 68 so that the trigger lever pin 66 of the trigger lever arm 46 will rest on top of the rolling ball 44.

The result of conducting a moment balance on the trigger lever arm 46 is that the pushing down force exerted by the trigger lever pin 66 of the trigger lever arm 46 on the rolling ball 44 is much less than the pushing up force exerted by the tip of the distal end 57 of the trigger spring 48 on the latching pin 70. Due to the softness of the trigger spring 48 the load when latched is little more than that required to trigger the camera. All this increases the sensitively.

When the impact activated camera triggering apparatus 10 is mounted within the vehicle, the central cavity 40 of the detent section 38 can move from under the rolling ball 44 in response to the inertial forces in the horizontal plane upon low intensity sudden impact on the vehicle from any horizontal direction, which drops the trigger lever pin 66 of the trigger lever arm 46 off from the rolling ball 44. The latching pin 70 of the trigger lever arm 46 releases the distal end 57 of the trigger spring 48 and the distal section 55 in turn presses on the tip of the shutter release button lever 8 of the disposable camera 14, to thereby automatically take the photographic picture at the moment of sudden impact. One of the advantages of the present invention is that the trigger spring 48 is pressing on the tip of the shutter release button lever 8, therefore a much smaller force is required and the mechanism is more sensitive. It also leaves the shutter release button lever 8 accessible to manually trigger the camera while it is installed in the mounting case 12.

Another advantage of the present invention is that the trigger spring 48 is prevented by the bottom panel 47 from pressing the shutter release button lever 8 beyond its normal travel once a picture is taken, as shown in FIG. 7. This prevents permanent damage to the shutter release button lever 8.

Figure 9:
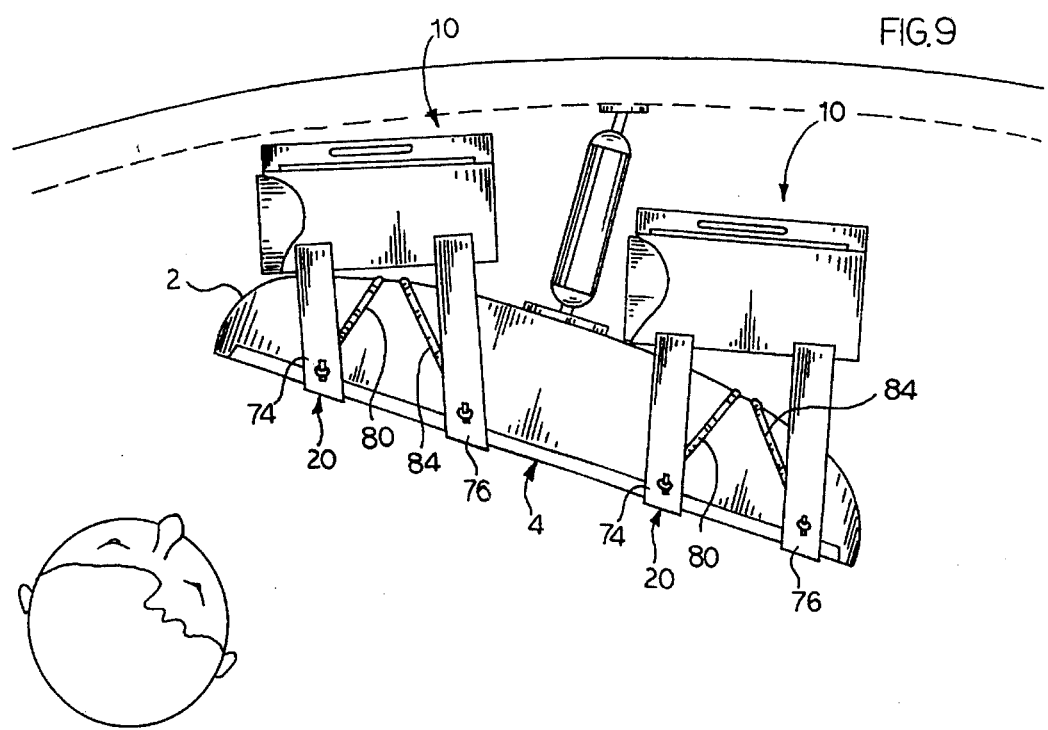
FIG. 9 is a top plan view of the impact triggering camera apparatus removably mounted behind a rear-view mirror of a vehicle, showing how the mounting case is indexing to the front side of the rear-view mirror.

Referring to FIGS. 8 and 9, there is shown at 20 the mounting means for the impact activated camera triggering apparatus 10. The mounting means 20 has means for mounting the mounting case 12 behind the rearview mirror 4 and indexing to the mirror side of the rear-view mirror 4. The mounting means 20 includes two top protruding arms 74 and 76, and a bottom protruding arm 78. The protruding arms 74, 76 and 78 are extending out from the top and bottom panels 33 and 35 beyond the back panel 31 of the rear compartment 18. Elastic bands 80 and 84 are provided and attached to the protruding arms 74, 76 and 78 for holding the mounting case 12 behind the rear-view mirror 4 and indexing the mounting case 12 to the mirror side of the rear-view mirror 4. The top protruding arm 76 has a greater length than the other top protruding arm 74 and the length of the lower arm is less than the average of the upper arms 74 and 76 so that the angle of the mounting means 20 is preadjusted to clamp to the mirror 4. This allows for the possibly in an appropriate vehicle for the mounting case 12 to be attached on either side of the rear-view mirror 4, as shown in FIG. 9. The mounting case 12 is always indexed with the mirror side of the rear-view mirror 4 because the elastic bands 80 and 84 preload the protruding arms 74, 76 and 78 to that side of the mirror. This ensures that the mounting case 12 always has a correct orientation for the nominal position of the mirror. The impact activated camera triggering apparatus 10 may also be attached behind the rear-view mirror 4 with a double sticky tape, mating hook and loop fasteners such as Velcro®, magnets, clips or any other suitable attachment means. It is located between the rear-view mirror 4 and the front windshield. This is an ideal place to mount the impact activated camera triggering apparatus 10 because it provides a good front view at the instant of any type of collision. It is also out of the driver or passengers' way and view. The impact activated camera triggering apparatus 10 will not hit the passenger in case of a collision and it is located within easy access for manual operation by the driver or passenger.

It will be appreciated that the present invention is not limited to the mounting position behind the rear-view mirror. It is emphasized that while behind the rear-view mirror 4 is the preferred mounting location, it is also within the spirit and scope of the present invention to have a multiplicity of mounting locations including on the dashboard. In addition, it is within the spirit and scope of the present invention for one skilled in the art to mount the impact activated camera triggering apparatus 10 at different locations within the vehicle, including adjacent the rear windshield to be able to take a photograph of the situation in which the vehicle is rear-ended.

Figure 10:
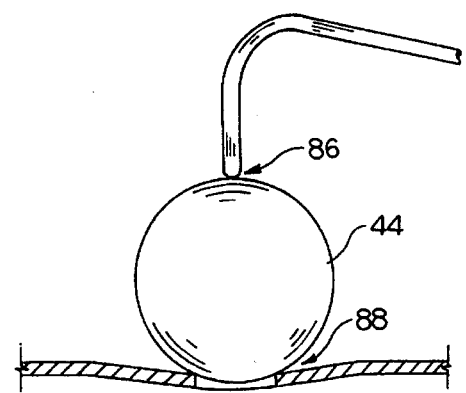
FIG. 10 is a partial cross-sectional view of the seismic mass of the impact activated triggering mechanism, in the form of a single rolling ball where there is both a sliding motion at one location and a rolling motion at another location.

Referring to FIG. 10, there is shown how the spherical rolling ball 44 reduces friction and induced resistance to motion of the rolling ball 44 relative to the mounting case. In the preferred embodiment, the rolling motion is at location 88 and the sliding motion is at location 86. Unlike a sliding mass which can only slide at both interfaces, the rolling mass has a much smaller and more repeatable resistance to motion.

Figure 10A:
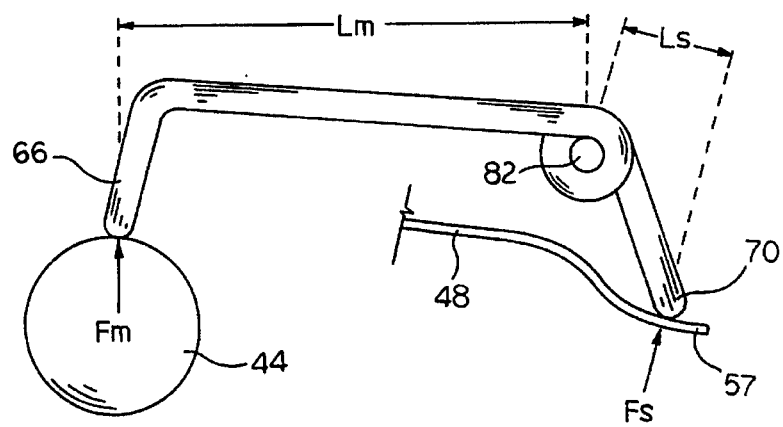
FIG. 10A is a partial perspective view of the present invention impact activated triggering mechanism, shown prior to triggering of the impact activated triggering mechanism and in the absence of friction the force applied by the seismic mass to the trigger lever pin times the horizontal projection of the distance from that contact to the trigger lever pivot axis is equal to the force applied by the distal end of the trigger spring to the trigger lever latching pin times the distance from a normal to that contact to the trigger lever pivot axis.

Referring to FIG. 10A, prior to triggering and in the absence of friction the force applied by the rolling ball 44 to the trigger lever pin 66 times the horizontal projection of the distance from that contact to the trigger lever pivot axis 82 is equal to the force applied by the distal end 57 of the trigger spring 48 to the trigger lever latching pin 70 times the distance from a normal to the contact to the trigger lever pivot axis 82 ($F_m \times L_m = F_s \times L_s$). If W is the weight of the rolling ball 44 reducing $F_s \times L_s (L_m \times W)$ makes the mechanism more sensitive to trigger. The force applied by the rolling ball 44 is upward. The force applied by the trigger spring 48 is upward if the points of load application are on the opposite side of the pivot axis but downward if they are on the same side. On reduction of force from the rolling ball 44, due to motion of the rolling ball 44 relative to the trigger lever latching pin 70, there is an unbalanced load on the trigger lever which causes it to rotate. In the cases of spring contact on the opposite side and below the axis or on the same side and above the axis the distance from the normal to the spring at that contact to the axis will increase with rotation. The converse is true for the other two cases. In all cases friction at the interfaces inhibits rotation. Thus, for reliable operation with negligible chance of termination once actuation is initiated the spring contact should be of one of the two cases stated, not one of the other two cases.

The effect of friction is proportional to the distance from the plane of the contacts to the pivot axis. This should be as small as possible but must be sufficient at the trigger lever latching pin 70 to allow that pin 70 to move from the latched position to a position clear of the tip of the distal end 57 of the trigger spring 48 when the trigger lever rotates after the trigger lever pin 66 drops off the rolling ball 44.

For a ball making rolling contact with an edge the farther a vertical axis through the center of the ball is from the contact as a fraction of the diameter of the ball the larger the resistance to motion. A ball resting in a cavity with a locus of contact around the rim of the cavity has higher resistance to motion than a ball which has started to raise up out of the cavity, by rolling at the point of contact on the cavity rim, which results in reliable operation with negligible chance of termination once motion is initiated. The threshold level for operation can be made more sensitive to an impact from the side of a vehicle than forward and backward by using an elliptical planform locus of contact with the short axis of the ellipse side to side in the vehicle. If the locus of contact is planer it has a circular planform. If the planform is not circular the locus of the contact is non-planar.

Figure 11:
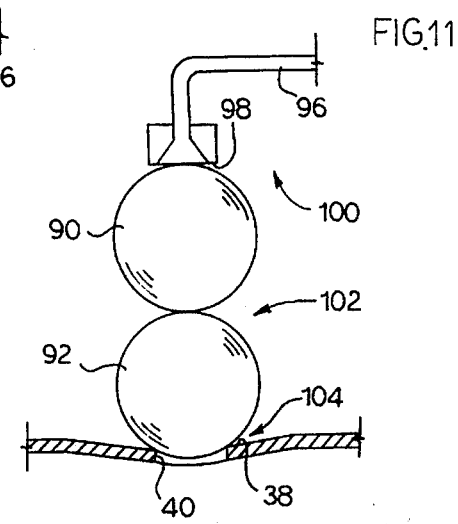
FIG. 11 is a partial cross-sectional view of an alternative embodiment of the seismic mass in the form of two rolling balls stacked on top of each other and utilizing rolling motion at three different locations.

Referring to FIG. 11, there is shown an alternative embodiment of the present invention which further reduces friction and improves repeatability. In this embodiment, two spherical rolling balls 90 and 92 are utilized. The ball ended trigger lever arm 46 (shown in FIGS. 2, 3, 4 and 6) is substituted with a trigger lever arm 96 which has a central cavity 98. A top spherical rolling ball 90 is stacked on top of another spherical rolling ball 92, while the bottom rolling ball 92 is retained within the central cavity 40 of the detent section 38, and the top rolling ball 90 is retained within the central cavity 98 of the trigger lever arm 96. In this embodiment, all sliding motion is eliminated so that the impact activated triggering mechanism utilizes only the rolling motion and will be more sensitive to and respond more repeatably to lateral movements as opposed to a device dependent on sliding motion. There are three arrows 100, 102 and 104 which are pointing at three different locations where the rolling motion occurs.

Figure 12:
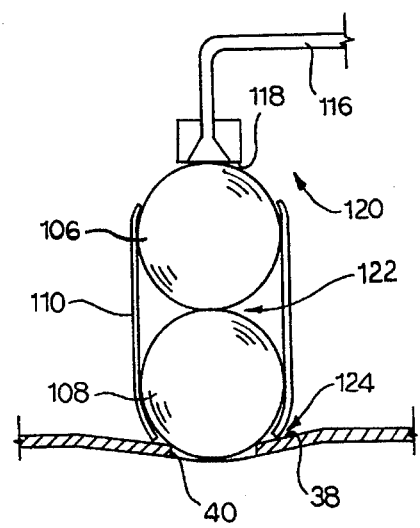
FIG. 12 is a partial cross-sectional view of another alternative embodiment of the seismic mass in the form of an open ended cylindrical housing loosely retaining two rolling balls and utilizing rolling motion at three different locations.

Referring to FIG. 12, there is shown another alternative embodiment of the present invention. This embodiment is similar to that shown in FIG. 11, but the two spherical rolling balls 106 and 108 are now retained within a loosely fitting open ended cylindrical shaped hollow housing 110. The spherical rolling balls 106 and 108 are stacked on top of each other such the bottom rolling ball 108 is retained within the central cavity 40 of the detent section 38, and the top rolling ball 106 is retained within the cavity 118 of the cavity ended trigger lever arm 116. In this embodiment, also the sliding motion is eliminated so that the impact activated triggering mechanism utilizes only the rolling motion and will be more sensitive to and respond more repeatably to lateral movements as opposed to the sliding motion. There are three arrows 120, 122 and 124 which are pointing at three different locations where the rolling motion occurs. The cylindrical housing 110 is used to allow a practical way to reposition the two rolling balls 106 and 108 after an impact.

Figure 13:
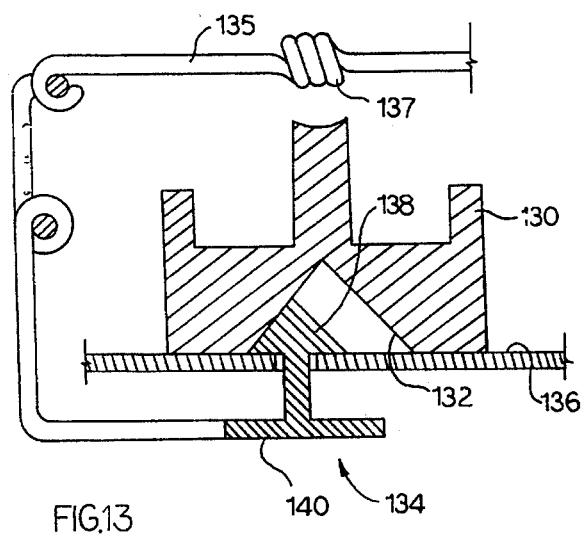
FIG. 13 is a partial cross-sectional view of still another alternative embodiment of the seismic mass in the form of a sliding mass and a reset button for single finger thrust resetting of the impact activated triggering mechanism.
Figure 14:
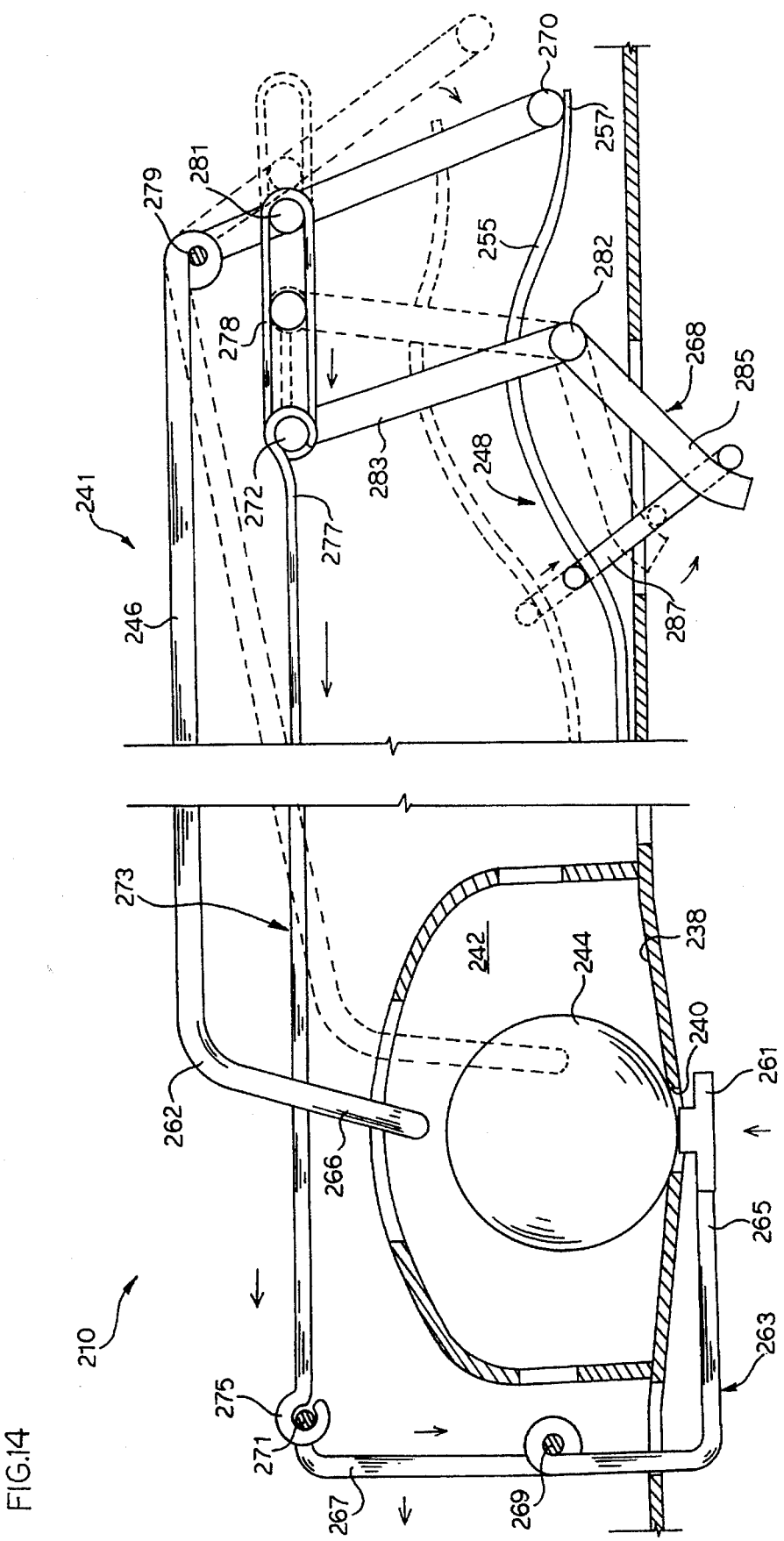
FIG. 14 is a partial cross-sectional view of another alternative embodiment of the impact activated triggering mechanism, showing a single finger thrust reset mechanism in the configuration just prior to completion of reset.

Referring to FIG. 13, there is shown still another alternative embodiment of the present invention. In this embodiment, only the sliding motion is utilized. It comprises a sliding mass 130 which is similar to the sliding mass of the '813 patent. The sliding mass 130 can be used similarly to FIG. 14, where the sliding mass 130 can be cocked by a single finger thrust reset mechanism, as shown in FIG. 14. The only difference between this embodiment and FIG. 14 is that the trigger lever arm 135 comprises a spring means 137 for resetting the impact activated triggering mechanism, and the description thereof will not be described in detail since it is described in FIG. 14 and only the modified components will be described below.

The sliding mass 130 has a hollow conical cavity 132 which is utilized for resetting the sliding mass 130 in its cocked position. A reset button 134 is located underneath the sliding mass 130 and separated by a bottom panel 136. The reset button 134 has a conical shaped head 138 and a base 140. The head 138 is above the bottom panel 136 and conforms to and is smaller than the conical cavity 132 of the sliding mass 130. When the reset button 134 is pressed, the tip of the head 138 moves up towards the tip of the conical cavity 132 to reset the sliding mass 130 into its cocked position. Gravity returns the reset button 134 to its normal position.

Referring to FIG. 14, there is shown an alternative embodiment of the present invention impact activated camera triggering apparatus 210. The parts are numbered correspondingly with 200 added to each number. Only the modified components of the impact activated triggering mechanism 241 will be described in detail. In this embodiment, the impact activated triggering mechanism 241 can be reset by a single finger thrust reset mechanism.

The impact activated triggering mechanism 241 includes the same components as shown in FIGS. 1 through 10 of the preferred embodiment, including a chamber 242 for retaining a seismic mass 244 in the form of a generally spherical rolling ball, a trigger lever arm 246 whose proximal end includes a link shaft 279, and a long narrow soft tapering trigger spring 248. The chamber 242 comprises a detent section 238 with a central cavity 240 therethrough.

The single finger thrust reset mechanism includes a reset button 261 which is located underneath the detent section 238. A connecting bell-crank 263 has a first end 265 connected to the reset button 261 and a second end 267 wrapped around a first pivot axle 269 and extends upwardly to form a loop 271. A reset tension element 273 has a hook end 275 and a delay link end 277. The hook end 275 hooks to the loop 271 of the connecting bell-crank 263. The delay link end 277 hooks to a link shaft 272 of a reset trigger bell-crank 268.

The reset trigger bell-crank 268 comprises an upper arm 283 and a lower arm 285. The lower end of the upper arm 283 and the upper end of the lower arm 285 are attached to a pivot shaft or axle 282. The upper arm 283 terminates in the link shaft 272 to which the reset tension element 273 is hooked. The lower arm 285 of the reset trigger bell-crank 268 is linked with the distal section 255 of the trigger spring 248 by a spring link 287. A delay link 278 loosely joins a link shaft 281 of the trigger lever arm 246 and the link shaft 272 of the reset trigger bell-crank 268.

As illustrated from the drawing, cocking is accomplished by first applying a light upward pressure on the reset button 261 so that the loop 271 of the connecting bell-crank 263 is pulled to the left, as shown with arrows. The reset tension element 273 is also pulled to the left and starts to move the link shaft 272 of the reset trigger bell-crank 268, so that the lower arm 285 of the reset trigger bell-crank 268 moves down such that it pulls through the spring link 287 and the distal section .255 of the trigger spring 248 into the cocked position. Further travelling of the reset trigger bell-crank link shaft 272 will engage the delay link 278 and the link shaft 281 of the trigger lever arm 246 and force the trigger lever arm 246 to be positioned in its cocked position with the latching pin 270 above the distal end 257 of the trigger spring 248 and raises the trigger lever pin 266 allowing clearance for the rolling ball 244 to roll back above the central cavity 240 of the detent section 238. This is a delayed motion because the delay link 278 is not initially engaged with both the reset trigger bell-crank link shaft 272 and the trigger lever link shaft 281. This delay motion ensures that there is no interference between the trigger spring distal end 257 and the trigger lever latching pin 270. Gravity will allow the rolling ball 244 to settle on the central cavity 240 of the detent section 238 to reset the rolling ball 244 into its cocked position. The upward pressure on the reset button 261 is released so that the trigger lever pin 266 will rest on top of the rolling ball 244.

The dotted lines show the impact activated triggering mechanism 241 in its uncocked position after a picture is taken, and the solid lines show the impact activated triggering mechanism 241 in its cocked position ready to take the next picture.

Figure 15:
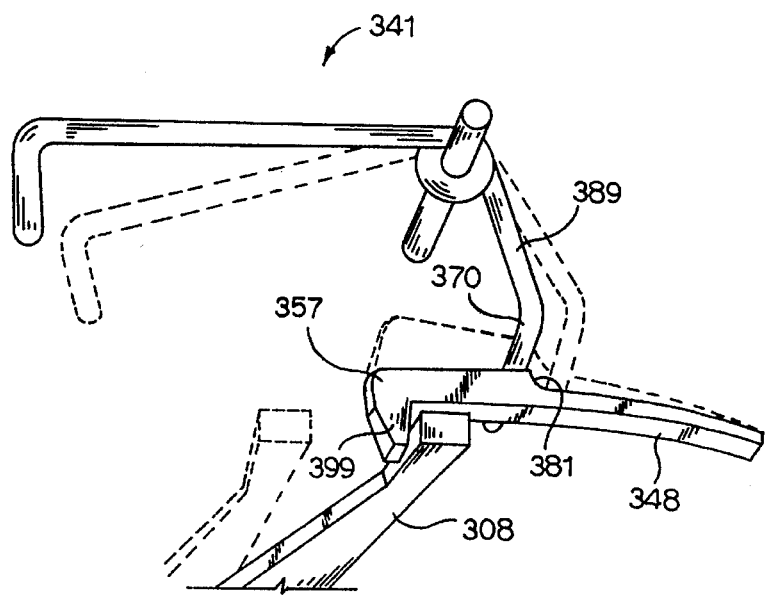
FIG. 15 is a partial perspective view of still another alternative embodiment of the impact activated triggering mechanism, showing a spring loaded lever whose motion initiates operation of a visual image recording device and the impact activated triggering mechanism.

Referring to FIG. 15, there is shown another alternative embodiment of the present invention impact activated triggering mechanism 341. The parts are numbered correspondingly with 300 added to each number. In this embodiment, the impact activated triggering mechanism 341 can be activated by a lever or element means 308 whose motion initiates operation. The lever 308 is spring loaded to induce motion. The distal end 357 of the trigger spring 348 comprises a lug 399 which latches the spring loaded lever 308 into a cocked configuration and prevents motion of the spring loaded lever 308 to initiate operation. When the trigger lever 389 is allowed to rotate, the latching pin 370 moves off the top of the trigger spring 348 and allows the spring loaded lever 308 to initiate operation of the visual image recording device. The trigger spring 348 has an offset 381 located on top and is needed for clearance after triggering has occurred.

The dotted lines show the impact activated triggering mechanism 341 in its uncocked or released position after a picture is taken, and the solid lines show the impact activated triggering mechanism 341 in its cocked position ready to take the next picture.

Figure 16:
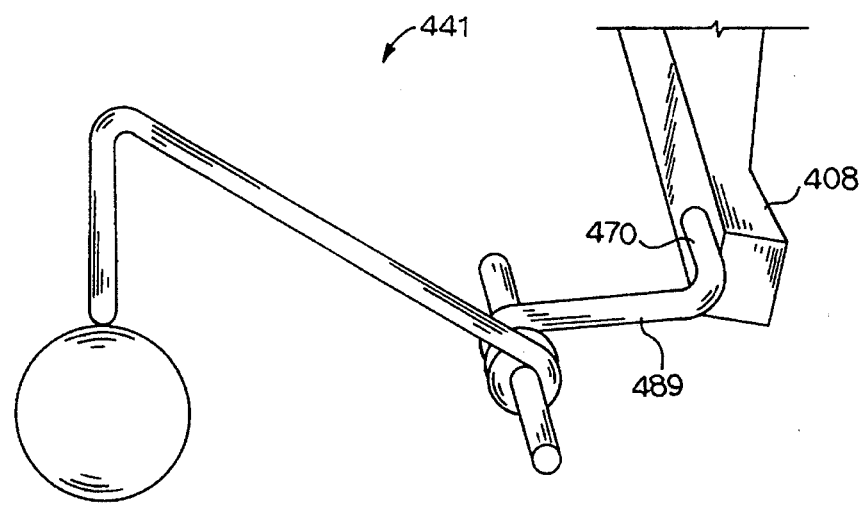
FIG. 16 is a partial perspective view of another alternative embodiment of the impact activated triggering mechanism, showing a spring loaded lever which is an internal part of a visual image recording device whose motion initiates operation of the integrated visual image recording device and the impact activated triggering mechanism.

Referring to FIG. 16, there is shown still another alternative embodiment of the present invention impact activated triggering mechanism 441. The parts are numbered correspondingly with 400 added to each number. In this embodiment, the impact activated triggering mechanism 441 can be activated by a lever or element means 408 which is an internal part of a visual image recording device. The lever 408 whose motion initiates operation is spring loaded to induce motion. The motion is prevented by the latching pin 470 of the trigger lever 489 in the cocked configuration, where the motion of the latching pin 470 allows the spring loaded lever 408 to directly initiate operation of the integrated visual image recording device and the triggering mechanism 441.

The present invention has many advantageous features including: (a) it reliably provides documentation of a vehicle collision; (b) it is inexpensive to manufacture; and (c) it can be used with conventional or low cost disposable wide-angle cameras.

Figure 17:
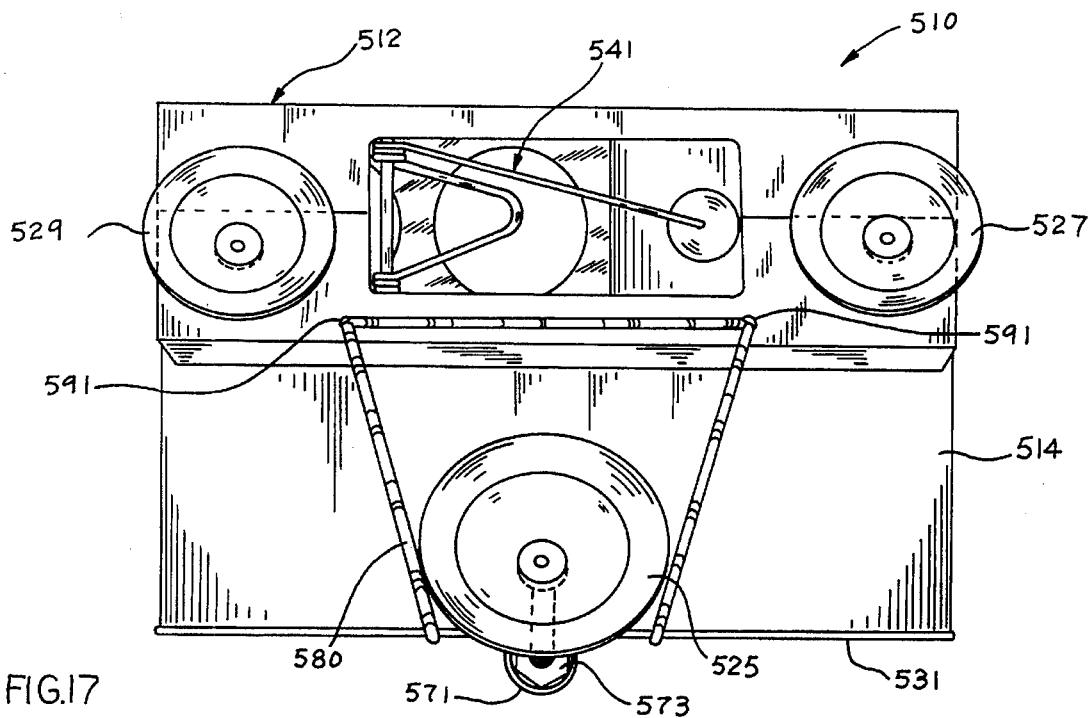
FIG. 17 is a top plan view of another embodiment of the present invention impact activated triggering camera apparatus.
Figure 18:
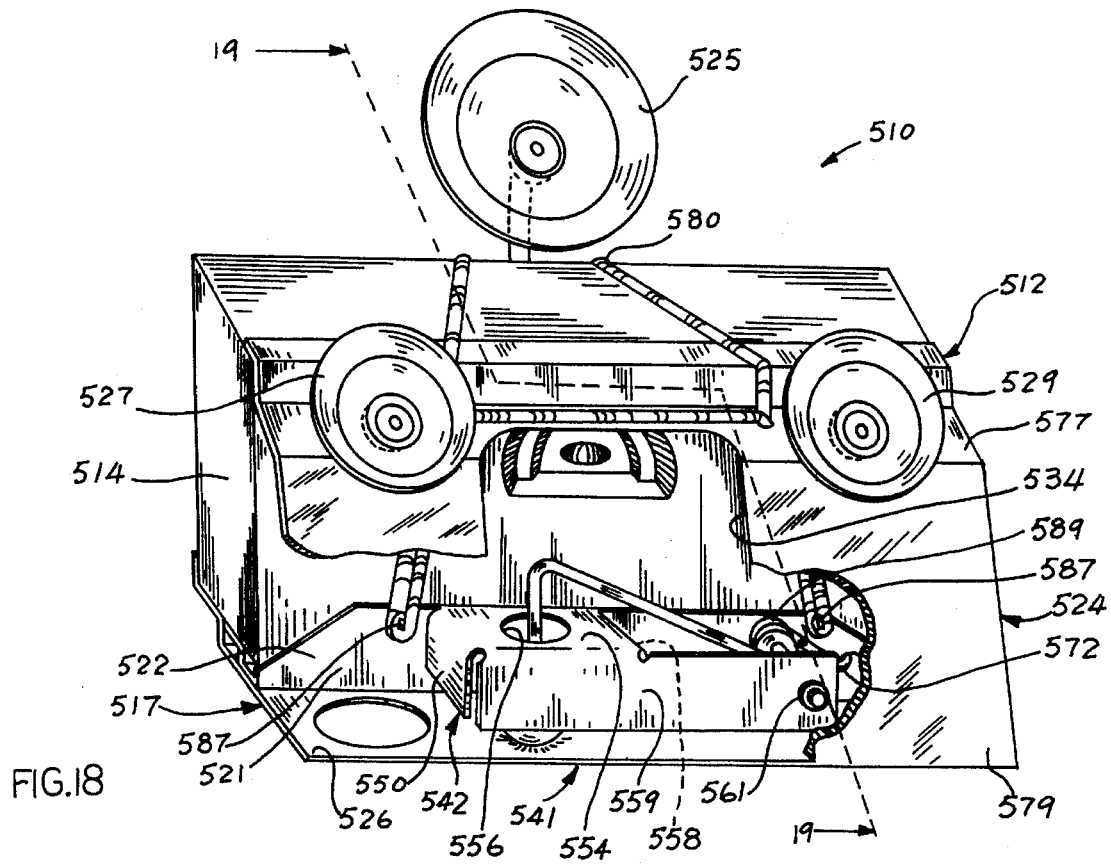
FIG. 18 is a front cutout perspective view of the present invention impact activated triggering camera apparatus.

There is illustrated another embodiment of the present invention impact activated camera triggering apparatus 51 0 which is depicted in FIGS. 17 through 19. This embodiment is very similar to the embodiment described in FIGS. 1 through 10 and the only difference is the nature and configuration of the mounting case or element 512. In addition, the impact activated triggering mechanism 541 in this embodiment assembles and functions the same as previously described in FIGS. 2 through 7, and the description thereof will not be repeated, and only the modified components will be described in detail. The triggering mechanism 541 comprises a seismic mass, an enclosure for retaining the seismic mass, a trigger lever arm, and the long narrow soft tapering trigger spring (see FIGS. 2 through 7, references numbers 42, 44, 46 and 48).

Referring to FIG. 17, there is depicted at 51 0 a top plan view of the present invention impact activated camera triggering apparatus which is removably attachable at any location inside a vehicle (which may be a truck, a bus, an automobile, or any other type of vehicle) for taking a photographic picture. The apparatus 510 comprises a mounting case or element 512 that supports a conventional disposable wide-angle lens camera 514 or any other photographic device.

The camera 514 comprises conventional parts, e.g., a shutter release button lever, a wide angle lens, means for retaining a roll of film, and means to advance the roll of film, such as a thumb wheel, after an exposure and set the shutter for a next shot. The camera 51 4 is installed invertedly in the mounting element 512 such that the shutter release button lever is pointing downward towards the ground or floor (see FIGS. 5 and 7, reference number 8).

Referring to FIGS. 18 and 19, there is depicted at 51 0 the present invention impact activated camera triggering apparatus. The mounting element 512 has a front panel 524, a base panel 517 with a step-down section 543 and a rear panel 531, in which they form a front housing 516 for housing an impact activated triggering mechanism 541 and a partially exposed rear housing 518 for housing the camera 514. The front panel 524 has a central opening 534 therethrough for accommodating the field of view of the wide angle lens of the camera 51 4, when the camera 51 4 is installed within the partially exposed rear housing 518. The front panel 524 is bent into three different sections which include an upper 90° flange section 575, a middle slanted section 577 and a lower slanted section 579. The upper flange section 575 is integrally connected to the middle slanted section 577, which in turn is integrally connected to the lower slanted section 579 which in turn is integrally connected to the base panel 517. The middle slanted section 577 is bent approximately at a range of a 25° to 30° angle from a horizontal dashed line 581. The lower slanted section 579 is bent approximately at a range of a 70° to 80° angle from the base panel 517.

The rear panel 531 is integrally formed with and upwardly extending from the base panel 517, where the rear panel 531 has a top end which terminates into a slanted flange 571 protruding outwardly away from the rear panel 531. A hook means 585 is integrally formed on the rear panel 531 and located below the slanted flange 571 and adjacent to the base panel 517.

A divider or partition 522 is attached to the base panel 51 7 such that the divider 522 forms an integral forward extension section 542, an integral rearward extension section 547 and an integral vertical extension section 521. The vertical extension section 521 separates the base panel 517 into a forward region or area 526 for the front housing 516 and a rear region or area 535 for the rear housing 518. The vertical extension section 521 has an aperture 572, a dimpled pivot hole 589 and two opposite hook or retaining means 587. The vertical extension section 521 extends upwardly approximately a quarter (¼) height of the front panel 524. The forward region 26 has at least three apertures and a detent region with a cavity therethrough between two of the three apertures (see FIGS. 2 and 3, reference numbers 36, 38 and 40).

The forward extension section 542 extends forwardly away from the vertical extension section 521 and is adapted to form a seismic chamber (see FIGS. 3 and 6, reference number 42), where the seismic chamber comprises a top side or surface 554 with an opening 556 therethrough, a front side or surface 559 with a pivot hole 561, and two end sides or surfaces 550 and 558. The seismic chamber encloses the detent region of the mounting element 512 such that the opening 556 on the top surface 554 above the cavity of the detent region (see FIGS. 3 and 6, reference numbers 38 and 40).

The rearward extension section 547 extends rearwardly away from the vertical extension section 521 and over the step-down section 543 such that it covers the step-down section 543 and leaves an open space or gap for mounting a long narrow soft tapering trigger spring (see FIGS. 4, 5 and 7, reference number 48). The rearward extension section 547 further has a cutout end opening (see FIGS. 5 and 7).

The mounting element 512 can be attached to any window surface of a vehicle by an upper central suction cup 525 and two lower separated suction cups 527 and 529. The upper suction cup 525 is attached to one end 567 of an elongated rod 565 and the other threaded end 569 of the rod 565 is attached and secured to the slanted flange 571 by screw nuts or other means 573. The two lower separated suction cups 527 and 529 are attached to the middle slanted section 577 at opposite locations by screws 583 and between the central opening 534 (see FIG. 18) and the ends of the mounting element 512.

Referring to FIGS. 18 and 19, there is shown at 580 an elastic or rubber band which is provided with the present invention apparatus 510, wherein one loop of the elastic band 580 is extended through each of two clearance holes 591 on the middle slanted section 577 (see FIG. 17). The elastic band 580 is looped to each of the two hook means 587 on the vertical extension section 521 and a third loop is looped to the hook means 585 (see FIG. 19). The camera 514 is installed in the rear housing 518 of the mounting element 512 such that a front side of the camera 514 abuts against the upper 90° flange section 575 of the front panel 524 and the vertical extension section 521. The elastic band 580 maintains the camera 514 in the rear housing 518 of the mounting element 512 and also rigidizes the mounting element 512 by preloading it to the camera 514.

The mounting element 512 can be made from several materials. The manufacturing process which could accommodate the construction of the mounting case may be injection, thermoform, etc. or other molding process. By way of example, the mounting element 512 may be made of aluminum such as, e.g., 6061 T4 or any other suitable type of material.

Figure 21:
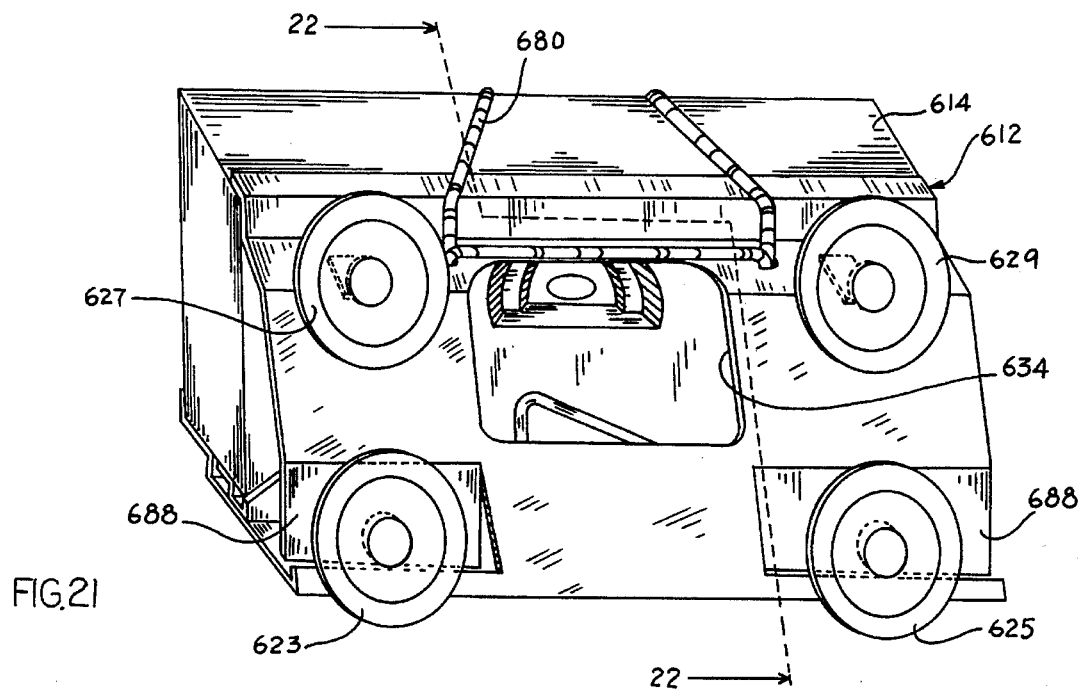
FIG. 21 is a perspective view of the present invention impact activated camera triggering apparatus.
Figure 22:
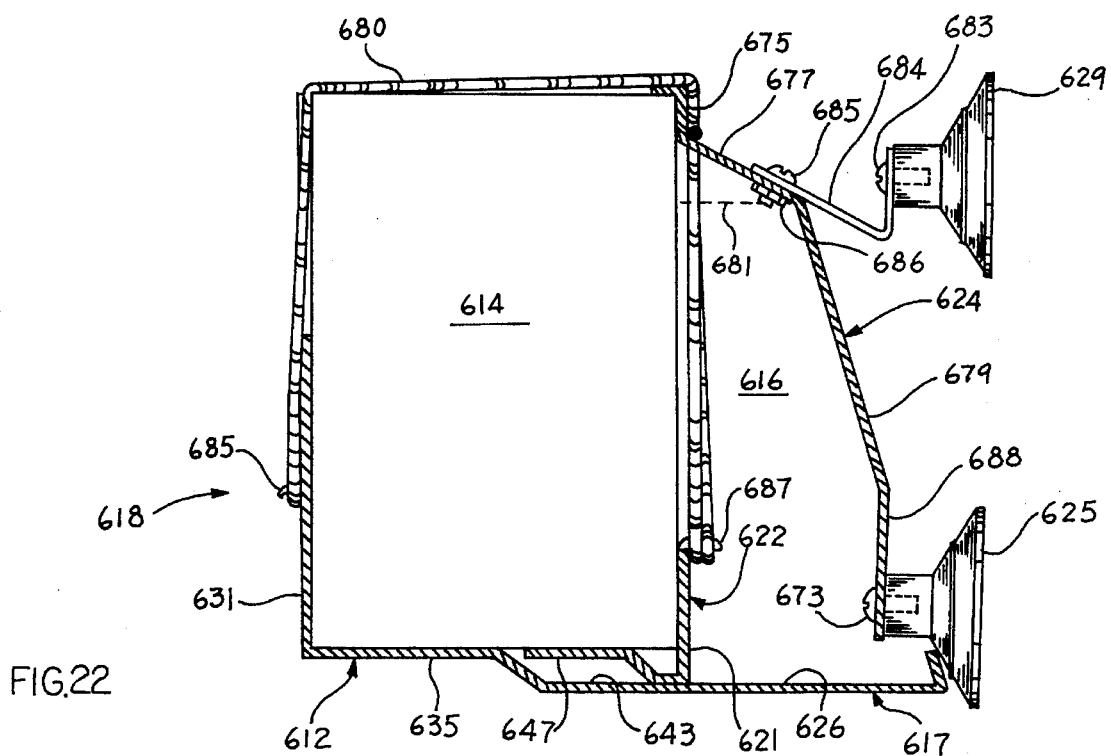
FIG. 22 is a partial cross-sectional view taken along line 22—22 of FIG. 21.

There is illustrated still another embodiment of the present invention impact activated camera triggering apparatus 610 which is depicted in FIGS. 20 through 22. This embodiment is very similar to the embodiment described in FIGS. 17 through 19 and the only difference is the nature and configuration of the mounting element 612 and the suction cups, and only the modified components will be described. In this embodiment, the mounting element 612 is preferably attachable to a more vertical window surface of a vehicle. Also, the impact activated triggering mechanism 641 (partially illustrated in FIG. 20) assembles and functions the same as previously described in FIGS. 2 through 7, and the description thereof will not be repeated. The triggering mechanism 641 comprises a seismic mass, an enclosure for retaining the seismic mass, a trigger lever arm, and the long narrow soft tapering trigger spring (see FIGS. 2 through 7, references numbers 42, 44, 46 and 48).

Referring to FIG. 20, there is depicted at 610 a top plan view of the present invention impact activated camera triggering apparatus which is removably attachable at any location inside a vehicle (which may be a truck, a bus, an automobile, or any other type of vehicle) for taking a photographic picture. The apparatus 610 comprises a mounting case or element 612 that supports a conventional disposable wide-angle lens camera 614 or any other photographic device.

The camera 614 comprises conventional parts, e.g., a shutter release button lever, a wide angle lens, means for retaining a roll of film, and means to advance the roll of film, such as a thumb wheel, after an exposure and set the shutter for a next shot. The camera 614 is installed invertedly in the mounting element 612 such that the shutter release button lever is pointing downward towards the ground or floor (see FIGS. 5 and 7, reference number 8).

Referring to FIGS. 21 and 22, there is depicted at 610 the present invention impact activated camera triggering apparatus. The mounting element 612 has a front panel 624, a base panel 617 with a step-down section 643 and a rear panel 631, in which they form a front housing 616 for housing an impact activated triggering mechanism 641 and a partially exposed rear housing 618 for housing the camera 614. The front panel 624 has a central opening 634 therethrough for accommodating the field of view of the wide angle lens of the camera 61 4, when the camera 61 4 is installed within the partially exposed rear housing 618. The front panel 624 is bent into three different sections which include an upper 90° flange section 675, a middle slanted section 677 and a lower slanted section 679. The upper flange section 675 is integrally connected to the middle slanted section 677, which in turn is integrally connected to the lower slanted section 679 which in turn is integrally connected to the base panel 617. The middle slanted section 677 is bent approximately at a range of a 25° to 30° angle from a horizontal dashed line 681. The lower slanted section 679 is bent approximately at a range of a 70° to 80° angle from the base panel 617. The rear panel 631 is integrally formed with and upwardly extending from the base panel 617. A hook means 685 is integrally formed on the rear panel 631 and located adjacent to the base panel 617.

A divider or partition 622 is attached to the base panel 617 such that the divider 622 forms an integral forward extension section, an integral rearward extension section 647 and an integral vertical extension section 621 (see FIG. 18). The vertical extension section 621 separates the base panel 617 into a forward region or area 626 for the front housing 616 and a rear region or area 635 for the rear housing 618. The vertical extension section 621 has an aperture, a dimpled pivot hole and two opposite hook or retaining means 687 (only one is shown). The vertical extension section 621 extends upwardly approximately a quarter (¼) height of the front panel 624. The forward region 626 has at least three apertures and a detent region with a cavity therethrough between two of the three apertures (see FIGS. 2 and 3, reference numbers 36, 38 and 40).

The forward extension section extends forwardly away from the vertical extension section 621 and is adapted to form a seismic chamber (see FIGS. 3 and 6, reference number 42), where the seismic chamber comprises a top side or surface with an opening therethrough, a front side or surface with a pivot hole, and two end sides or surfaces. The seismic chamber encloses the detent region of the mounting element 612 such that the opening on the top surface is above the cavity of the detent region (see FIGS. 3 and 6, reference numbers 38 and 40).

The rearward extension section 647 extends rearwardly away from the vertical extension section 621 and over the step-down section 643 such that it covers the step-down section 643 and leaves an open space or gap for mounting a long narrow soft tapering trigger spring (see FIGS. 4, 5 and 7, reference number 48). The rearward extension section 647 further has a cutout end opening (see FIGS. 5 and 7).

Referring to FIGS. 20 and 22, the mounting element 612 can be attached to any window surface of a vehicle by four suction cups 623, 625, 627 and 629. The upper suction cups 627 and 629 are each attached to a bracket 684 and secured by a screw 683. The brackets 684 are then attached at opposite ends of the middle slanted section 677 of the front panel 624 by screws 685 and nuts 686. Each bracket 684 has a slotted aperture 687 for slidably adjusting each bracket 684 in a forward or backward direction. The lower suction cups 623 and 625 are each attached to an opposite cut-out tab 688 on the middle slanted section 677 by a screw 673. The cut-out tabs 688 are only attached at the top ends (see FIG. 22). Basically, the four suction cups 623, 625, 627 and 629 are vertically positioned on the mounting element 612, where suction force of all four suction cups are facing toward a near vertical window surface of a vehicle for attaching to the vehicle.

Referring to FIGS. 21 and 22, there is shown at 680 an elastic or rubber band which is provided with the present invention apparatus 610, wherein one loop of the elastic band 680 is extended through each of two clearance holes 691 on the middle slanted section 677 (see FIG. 20). The elastic band 680 is looped to the two hook means 687 on the vertical extension section 621 and a third loop is looped to the hook means 685 (see FIG. 22). The camera 614 is installed in the rear housing 618 of the mounting element 612 such that a front side of the camera 61 4 abuts against the upper 90° flange section 675 of the front panel 624 and the vertical extension section 621. The elastic band 680 maintains the camera 614 in the rear housing 618 of the mounting element 612 and also rigidizes the mounting element 612 by preloading it to the camera 614.

FIG. 23 shows a perspective view of still further another embodiment of the present invention impact activated camera triggering apparatus 710. FIG. 24 shows a partial cross-sectional view taken along line 24–24 of FIG. 23. Referring to FIGS. 23 and 24, the apparatus 710 is used in combination with a vehicle such that the impact activated camera triggering apparatus is attachable to a window surface of the vehicle. The apparatus 710 comprises an inverted camera 714 for taking a photographic picture. The internal of the inverted camera 714 is shown in dashed lines (see FIG. 24). The inverted camera 714 has a front side 704, a back side 705, a top side 707, a bottom side 709, a lens 706 located on the front side 704 and a shutter release button lever (see FIGS. 5 and 7, reference number 8) located on the bottom side 709. The front side 704 of the inverted camera 714 has an aperture 772 and a closed bottom pivot hole 789. A flange 771 is integrally formed with the back side 705 of the inverted camera 714 and protrudes rearwardly and upwardly at an angle.

A front mounting element 716 is integrally formed with the front side 704 of the inverted camera 714. The mounting element 716 has a slanted top portion 775, a slanted front portion 779 and a base portion 717. The slanted front portion 775 has an opening 734 therethrough for accommodating the field of view of the lens 706 of the inverted camera 714. The base portion 717 has three apertures 736 and a detent region 738 with a cavity 740 therethrough between two of the three apertures (see FIG. 25). The three apertures 736 are provided to be used as a chimney effect for cooling the inverted camera 714.

A forward extension portion 742 is integrally formed with the front side 704 of the inverted camera 714 and located below the lens 706. The forward extension portion 742 extends forwardly to form a seismic enclosure or chamber (see FIGS. 3 and 6, reference number 42). The seismic enclosure has a top surface 754 with an opening 756 therethrough, a front surface 759 with a pivot hole 761 and two end surfaces 750 and 758. The surfaces of the seismic enclosure enclose the detent region 738 of the base portion 717 of the mounting element 716, where the opening 756 on the top surface 754 is above the cavity of the detent region 738. A rolling ball or mass 744 is placed within and retained by the seismic enclosure and being able to roll on the detent region 738, where the rolling ball 744 is limited to a horizontal plane movement and responsive to inertial forces.

Referring to FIG. 25, there is shown at 710 a bottom plan view of the present invention impact activated camera triggering apparatus. A trigger spring 748 is installed within a cavity 743 of the inverted camera 714 and located adjacent to the bottom side 709. The trigger spring 748 is similar to the previously described trigger spring shown in FIG. 4, reference number 48, which comprises a distal section with a distal end and a proximal section with a proximal end, where the proximal end is permanently fixed.

Referring again to FIGS. 23 and 24, a trigger lever arm is pivotally mounted between the pivot hole 761 of the front surface 759 of the forward extension portion 742 and the closed bottom pivot hole 789 of the front side 704 of the inverted camera 714 at a location remote from the rolling ball 744. The trigger lever arm has a distal end and a proximal end (see FIGS. 3 and 4). The distal end forms a trigger lever pin which extends down through the opening 756 of the top surface 754 of the forward extension portion 742 and rests on the rolling ball 744 when the rolling ball is seated above the cavity of the detent region. The proximal end forms a reset trigger lever and a latching pin. The reset trigger lever rests above a respective one of the three apertures on the base portion. The latching pin extends through the aperture 772 of the front side 704 of the inverted camera 714 for latching the distal end of the trigger spring. The reset trigger lever of the trigger lever arm facilitates the cocking of the distal section of the trigger spring by locating the latching pin of the trigger lever arm above the distal end of the trigger spring to prevent the distal section of the trigger spring from pressing up on the shutter release button lever 708 (shown in dashed line, see FIG. 24) of the inverted camera prematurely.

The inverted camera 714 can be attached to any window surface of a vehicle by an upper central suction cup 725 and two lower separated suction cups 727 and 729. A rod 765 has a threaded end 769 mounted and secured to the flange 771 on the back Side 705 of the inverted camera 714 by screw nuts or other means 773 and the other end 767 extends upwardly above the top side 707 of the inverted camera 714, where the upper suction cup 725 is attached. The two lower separated suction cups 727 and 729 are mounted to the slanted top portion 775 of the mounting element 716 at opposite locations by screws 783 and between the opening 734 (see FIG. 23) and the ends of the camera.

Referring to FIG. 26, there is shown at 781 an enlarged partial bottom plan view of a pendant or a string. The pendant 781 is located on the distal end of the trigger spring 748 such that the pendant 781 can be pulled downwardly through a narrow opening 799 on the bottom side 709 of the apparatus 710 for cocking the distal section of the trigger spring 748 to prepare the inverted camera 714 to take a photographic picture. The narrow opening 799 will maintain the pendant 781 in place on the distal end of the trigger spring 748.

Defined in detail, the present invention is in combination with a vehicle having at least one window surface and a camera having a lens and a shutter release button lever for taking a photographic picture, an impact activated camera triggering apparatus comprising: (a) a mounting element having a partial rear panel, a base panel and a front panel, the partial rear panel integrally formed with and upwardly extending from the base panel and having a top end terminating into a slanted flange protruding outwardly away from the mounting element, the base panel having a step-down section with a forward region and a rear region, the forward region having at least two apertures and a detent region with a cavity therethrough between the at least two apertures, the front panel having an opening therethrough for accommodating the field of view of the lens of the camera, where the front panel forms an upper flange section, a middle slanted section and a lower slanted section; (b) a divider including a forward extension section, a rearward extension section and a vertical extension section; (c) the forward extension section forming a top surface with an opening therethrough, a front surface with a pivot hole and two end surfaces which enclose the detent region of the mounting element with the opening on the top surface above the cavity of the detent region; (d) the rearward extension section covering the rear region of the step-down section of the base panel of the mounting element and having a cutout end opening; (e) the vertical extension section having an aperture and a dimpled pivot hole; (f) a trigger spring mounted within the rear region of the step-down section and having a tapering distal section with a narrow distal end, a wide middle section, and a tapering proximal section with a narrow proximal end, the proximal end located relative to the rearward extension section such that the middle section abuts against the base panel, and the distal end protruding out from the cutout end opening on the rearward extension section; (g) a rolling ball retained by the forward extension section and being able to roll on the detent region, where the rolling ball is limited to a horizontal plane movement and responsive to inertial forces; (h) a trigger lever arm pivotally mounted between the pivot hole of the front surface of the forward extension section and the dimpled pivot hole of the vertical extension section at a location remote from the rolling ball and having a distal end and a proximal end, the distal end forming a trigger lever pin extending down through the opening of the top surface of the forward extension section and resting on the rolling ball when the rolling ball is seated above the cavity of the detent region, the proximal end forming a reset trigger lever and resting above a respective one of the at least two apertures on the forward region of the base panel and a latching pin extending through the aperture of the vertical extension section for latching the distal end of the trigger spring; (i) the reset trigger lever of the trigger lever arm facilitating the cocking of the tapering distal section of the trigger spring by latching the latching pin of the trigger lever arm over the narrow distal end of the trigger spring to prevent the tapering distal section of the trigger spring from pressing up on the shutter release button lever of the camera prematurely; (j) an elongated rod having one end attached to the slanted flange of the rear panel and the other end extending upwardly above the camera; (k) an upper central suction cup attached to the other end of the elongated rod such that it adheres to the at least one window surface of the vehicle; (I) two separated lower suction cups attached to the middle slanted section of the front panel and opposite each other such that the two separated lower suction cups adhere to the at least one window surface of the vehicle; and (m) means for retaining the camera when the camera is invertedly installed within the rear region of the mounting element; (n) whereby the rolling ball can be moved off from the cavity of the detent region in response to the inertial forces in the horizontal plane upon sudden impact on the vehicle from any lateral direction, which drops the trigger lever pin of the trigger lever arm off from the rolling ball, causing the latching pin of the trigger lever arm to release the tapering distal section of the trigger spring which in turn presses on the shutter release button lever of the camera, to thereby automatically take the photographic picture at the moment of sudden impact.

Defined broadly, the present invention is in combination with a vehicle having at least one window and a camera having a lens and a shutter release button lever for taking a photographic picture, an impact activated camera triggering apparatus comprising: (a) a mounting element having a rear panel, a base panel and a front panel, the rear panel having an upper flange, the base panel having a step-down section with a forward region and a rear region, the forward region having at least one aperture and a detent region with a cavity therethrough, the front panel having an opening therethrough for accommodating the field of view of the lens of the camera; (b) a divider including a forward extension, a rearward extension and a vertical extension, the forward extension forming a top surface with an opening, a front surface and two end surfaces which enclose the detent region, where the opening on the top surface is above the cavity of the detent region, the rearward extension covering the rear region of the step-down section and having a cutout end opening, the vertical extension having an aperture; (c) a trigger spring mounted within the rear region of the step-down section and having a distal section with a distal end, a middle section, and a proximal section with a proximal end, the proximal end located relative to the rearward extension such that the middle section abuts against the base panel, and the distal section being loaded; (d) a rolling mass retained by the forward extension of the divider and being able to roll on the detent region, where the rolling mass responds to inertial forces; (e) a trigger lever arm pivotally mounted between the front surface of the forward extension and the vertical extension of the divider at a location remote from the rolling mass and having a distal end and a proximal end, the distal end forming a trigger lever pin extending down through the opening of the top surface of the forward extension and resting on the rolling mass when the rolling mass is located over the cavity of the detent region, and the proximal end forming a reset trigger lever and a latching pin extending through the aperture of the vertical extension of the divider for loading the distal end of the trigger spring; and (f) the reset trigger lever of the trigger lever arm facilitating the cocking of the distal section of the trigger spring by latching the latching pin of the trigger lever arm over the distal end of the trigger spring to prevent the distal section of the trigger spring from pressing up on the shutter release button lever of the camera prematurely; (g) a rod having one end attached to the top flange of the rear panel and the other end extending upwardly above the camera; (h) at least three suction cups attached to the other end of the rod and the front panel respectively such that the at least three suction cups adhere to the at least one window of the vehicle; and (j) means for retaining the camera when the camera is installed within the rear region of the mounting element; (k) whereby the rolling mass can be moved off from the cavity of the detent region in response to the inertial forces in the horizontal plane upon sudden impact on the vehicle from any direction, which drops the trigger lever pin of the trigger lever arm off from the rolling mass, causing the latching pin of the trigger lever arm to release the distal section of the trigger spring which in turn presses on the shutter release button lever of the camera, to thereby automatically take the photographic picture at the moment of sudden impact.

Defined alternatively in detail, the present invention is in combination with a vehicle having at least one window surface and a camera having a lens and a shutter release button lever for taking a photographic picture, an impact activated camera triggering apparatus comprising: (a) a mounting element having a partial rear panel, a base panel and a front panel, the partial rear panel integrally formed with and upwardly extending from the base panel, the base panel having a step-down section with a forward region and a rear region, the forward region having at least two apertures and a detent region with a cavity therethrough between the at least two apertures, the front panel having an opening therethrough for accommodating the field of view of the lens of the camera, where the front panel forms a slanted upper flange, a slanted middle section and a slanted lower section, the slanted middle section having two opposite cutout tabs being integrally attached at top ends to the lower slanted section and bendable in a backward or forward direction; (b) a divider including a forward extension section, a rearward extension section and a vertical extension section; (c) the forward extension section forming a top surface with an opening therethrough, a front surface with a pivot hole and two end surfaces which enclose the detent region of the mounting element with the opening on the top surface above the cavity of the detent region; (d) the rearward extension section covering the rear region of the step-down section of the base panel of the mounting element and having a cutout end opening; (e) the vertical extension section having an aperture and a dimpled pivot hole; (f) a trigger spring mounted within the rear region of the step-down section and having a tapering distal section with a narrow distal end, a wide middle section, and a tapering proximal section with a narrow proximal end, the proximal end located relative to the rearward extension section such that the middle section abuts against the base panel, and the distal end located adjacent to the cutout end opening on the rearward extension section; (g) a rolling ball retained by the forward extension section and being able to roll on the detent region, where the rolling ball is limited to a horizontal plane movement and responsive to inertial forces; (h) a trigger lever arm pivotally mounted between the pivot hole of the front surface of the forward extension section and the dimpled pivot hole of the vertical extension section at a location remote from the rolling ball and having a distal end and a proximal end, the distal end forming a trigger lever pin extending down through the opening of the top surface of the forward extension section and resting on the rolling ball when the rolling ball is seated above the cavity of the detent region, the proximal end forming a reset trigger lever and resting above a respective one of the at least two apertures on the forward region of the base panel and a latching pin extending through the aperture of the vertical extension section for latching the distal end of the trigger spring; (i) the reset trigger lever of the trigger lever arm facilitating the cocking of the tapering distal section of the trigger spring by latching the latching pin of the trigger lever arm over the narrow distal end of the trigger spring to prevent the tapering distal section of the trigger spring from pressing up on the shutter release button lever of the camera prematurely; (j) two opposite slidable brackets slidably mounted on the slanted middle section of the front panel and adjustable in a backward or forward direction; (k) at least four suction cups each one respectively secured to the two opposite slidable brackets and the two cutout tabs of the front panel, where the at least four suction cups adhere to the at least one window surface of the vehicle; and (l) means for retaining the camera when the camera is invertedly installed within the rear region of the mounting element; (m) whereby the rolling ball can be moved off from the cavity of the detent region in response to the inertial forces in the horizontal plane upon sudden impact on the vehicle from any lateral direction, which drops the trigger lever pin of the trigger lever arm off from the rolling ball, causing the latching pin of the trigger lever arm to release the tapering distal section of the trigger spring which in turn presses on the shutter release button lever of the camera, to thereby automatically take the photographic picture at the moment of sudden impact.

Defined alternatively broadly, the present invention is in combination with a vehicle having at least one window and a camera having a lens and a shutter release button lever for taking a photographic picture, an impact activated camera triggering apparatus comprising: (a) a mounting element having a rear panel, a base panel and a front panel, the base panel having a step-down portion with a forward region and a rear region, the forward region having at least one aperture and a detent region with a cavity therethrough, the front panel having an opening therethrough for accommodating the field of view of the lens of the camera and at least two tabs being attached at their top ends and bendable in a backward or forward direction; (b) a divider including a forward extension, a rearward extension and a vertical extension, the forward extension forming a top surface with an opening, a front surface and two end surfaces which enclose the detent region, where the opening on the top surface is above the cavity of the detent region, the rearward extension covering the rear region of the step-down portion and having a cutout end opening, the vertical extension having an aperture; (c) a trigger spring mounted within the rear region of the step-down portion and having a distal section with a distal end, a middle section and a proximal section with a proximal end, the proximal end located relative to the rearward extension such that the middle section abuts against the base panel, and the distal section being loaded; (d) a rolling mass retained by the forward extension of the divider and being able to roll on the detent region, where the rolling mass responds to inertial forces; (g) a trigger lever arm pivotally mounted between the front surface of the forward extension and the vertical extension of the divider at a location remote from the rolling mass and having a distal end and a proximal end, the distal end forming a trigger lever pin extending down through the opening of the top surface of the forward extension and resting on the rolling mass when the rolling mass is seated above the cavity of the detent region, the proximal end forming a reset trigger lever and resting above the at least one aperture on the base panel and a latching pin extending through the aperture on the vertical extension for latching the distal end of the trigger spring; (h) the reset trigger lever of the trigger lever arm facilitating the cocking of the distal section of the trigger spring by latching the latching pin of the trigger lever arm over the distal end of the trigger spring to prevent the distal section of the trigger spring from pressing up on the shutter release button lever of the camera prematurely; (i) at least two brackets slidably mounted on the front panel above the at least two tabs and slidably adjustable in a backward or forward direction; (j) at least four suction cups each one respectively secured to the at least two brackets and the at least two tabs, where the at least four suction cups adhere to the at least one window of the vehicle; and (k) means for retaining the camera when the camera is installed in the rear region of the mounting element; (l) whereby the rolling mass can be moved off from the cavity of the detent region in response to the inertial forces upon sudden impact on the vehicle from any lateral direction, which drops the trigger lever pin of the trigger lever arm off from the rolling mass, causing the latching pin of the trigger lever arm to release the distal section of the trigger spring which in turn presses on the shutter release button lever of the camera, to thereby automatically take the photographic picture at the moment of sudden impact.

Defined further broadly, the present invention is a triggering mechanism attachable to a vehicle in a position from which there is a view outside the vehicle for use with a visual image recording device having an element whose motion initiates operation, the triggering mechanism comprising: (a) a mounting element having at least one suction cup mounted and positioned on the mounting element for adhering to and maintaining the visual image recording device to the vehicle; (b) a seismic mass limited to small movements essentially in a horizontal plane and responsive to inertial forces; (c) a trigger spring having a distal end and a proximal end, and being fixedly located relative to the mounting element, where the distal end is loaded and induces motion of the element of the visual image recording device, whose motion initiates operation, when it is released; (d) means for maintaining the position of the seismic mass relative to the mounting element in the absence of an acceleration in excess of a desired threshold value; (e) a trigger lever arm having a pivot axis, a distal end and a proximal end, the trigger lever arm pivoted about the pivot axis relative to the mounting element, the distal end forming a trigger lever pin resting on the seismic mass when the seismic mass is in the position in which it is maintained by the means for maintaining the position of the seismic mass, and the proximal end forming a latching pin, which loads the distal end of the trigger spring; and (f) means for retaining the visual image recording device when the recording device is installed to the vehicle; (g) whereby in response to the acceleration in excess of the desired threshold induced by a sudden impact on the vehicle from any direction, the seismic mass is moved relative to the mounting element essentially in the horizontal plane from the position in which it is maintained by the means for maintaining the position of the seismic mass, which drops the trigger lever pin off from the seismic mass, allowing the trigger spring to rotate the trigger lever arm, causing the latching pin to release the distal end of the trigger spring, which moves the element of the visual image recording device that initiates operation of the visual image recording device, to thereby automatically record a visual image at the moment of sudden impact.

Defined further more broadly, the present invention is a triggering mechanism attachable to a vehicle in a position from which there is a view outside the vehicle for use with a visual image recording device having an element whose motion initiates operation, the triggering mechanism comprising: (a) a seismic mass limited to small movements essentially in a horizontal plane and responsive to inertial forces; (b) a trigger spring having a distal end and a proximal end, and being fixedly located relative to the visual image recording device, where the distal end is loaded and induces motion of the element of the visual image recording device, whose motion initiates operation, when it is released; (c) means for maintaining the position of the seismic mass in the absence of an acceleration in excess of a desired threshold value; and (d) a trigger lever arm having a pivot axis, a distal end and a proximal end, the trigger lever arm pivoted about the pivot axis, the distal end forming a trigger lever pin resting on the seismic mass when the seismic mass is in the position in which it is maintained by the means for maintaining the position of the seismic mass, and the proximal end forming a latching pin, which loads the distal end of the trigger spring; (e) whereby in response to the acceleration in excess of the desired threshold induced by a sudden impact on the vehicle from any direction, the seismic mass is moved essentially in the horizontal plane from the position in which it is maintained by the means for maintaining the position of the seismic mass, which drops the trigger lever pin off from the seismic mass, allowing the trigger spring to rotate the trigger lever arm, causing the latching pin to release the distal end of the trigger spring, which moves the element of the visual image recording device that initiates operation of the visual image recording device, to thereby automatically record a visual image at the moment of sudden impact.

Defined further even more broadly, the present invention is a triggering mechanism attachable to a vehicle in a position from which there is a view outside of the vehicle for use with a visual image recording device having an element whose motion initiates operation, the triggering mechanism comprising: (a) a seismic mass limited to small movements essentially in a horizontal plane and responsive to inertial forces; (b) a trigger spring having a distal end and a proximal end, and being fixedly located relative to the visual image recording device, where the distal end is loaded and induces motion of the element of the visual image recording device, whose motion initiates operation, when it is released; and (c) a trigger lever arm having a pivot axis, a distal end and a proximal end, the trigger lever arm pivoted about the pivot axis, the distal end forming a trigger lever pin resting on the seismic mass, and the proximal end forming a latching pin, which loads the distal end of the trigger spring; (d) whereby in response to an acceleration induced by a sudden impact on the vehicle from any direction, the seismic mass is moved essentially in the horizontal plane, which drops the trigger lever pin off from the seismic mass, allowing the trigger spring to rotate the trigger lever arm, causing the latching pin to release the distal end of the trigger spring, which moves the element of the visual image recording device that initiates operation of the visual image recording device, to thereby automatically record a visual image at the moment of sudden impact.

Defined also alternatively in detail, the present invention is an impact activated camera triggering apparatus attachable to a vehicle in a position from which there is a view from the vehicle, the apparatus comprising: (a) an inverted camera for taking a photographic picture and having a back side, a front side, a bottom end, a top end, a lens located on the front side, and a shutter release button lever located on the bottom end, the front side having an aperture and a closed bottom pivot hole; (b) a mounting element integrally formed with the front side of the inverted camera and having a base portion, a slanted front portion, and a slanted top portion, the base portion having at least two apertures and a detent region with a cavity therethrough between the at least two apertures, the slanted front portion having an opening therethrough for accommodating the field of view of the lens of the inverted camera; (c) a seismic enclosure located below the lens and having a top surface with an opening therethrough, a front surface with a closed bottom pivot hole and two end surfaces, which enclose the detent region of the base portion of the mounting element, where the opening on the top surface is above the cavity of the detent region; (d) a trigger spring installed within a cavity of the inverted camera that does not enclose a film and located adjacent to the bottom side, the trigger spring having a distal section with a distal end and a proximal section with a proximal end, where the proximal end is permanently fixed; (e) a rolling ball retained by the seismic enclosure and being able to roll on the detent region, where the rolling ball is limited to a horizontal plane movement and responsive to inertial forces; (f) a trigger lever arm pivotally mounted between the pivot hole of the front surface of the seismic enclosure and the closed bottom pivot hole on the front side of the inverted camera at a location remote from the rolling ball and having a distal end and a proximal end, the distal end forming a trigger lever pin extending down through the opening of the top surface of the forward extension portion and resting on the rolling ball when the rolling ball is seated above the cavity of the detent region, the proximal end forming a reset trigger lever and resting above a respective one of the at least two apertures on the base portion and a latching pin extending through the aperture of the front side of the inverted camera for latching the distal end of the trigger spring; (g) the reset trigger lever of the trigger lever arm facilitating the cocking of the distal section of the trigger spring by latching the latching pin of the trigger lever arm above the distal end of the trigger spring to prevent the distal section of the trigger spring from pressing up on the shutter release button lever of the inverted camera prematurely; (h) a flange integrally formed with the back side of the inverted camera and protruding rearwardly and upwardly at an angle; (i) a rod having one end mounted to the flange of the back side of the camera and the other end extending upwardly above the top end of the inverted camera; (j) an upper suction cup attached to the other end of the rod such that it adheres to the vehicle; (k) two separated lower suction cups mounted to the slanted top portion of the mounting element and opposite each other such that the two separated lower suction cups adhere to the vehicle; and (l) means for cocking the distal section of the trigger spring to prepare the apparatus to take a photographic picture; (m) whereby the rolling ball can be moved off from the cavity of the detent region in response to the inertial forces in the horizontal plane upon sudden impact on the vehicle from any lateral direction, which drops the trigger lever pin of the trigger lever arm off from the rolling ball, causing the latching pin of the trigger lever arm to release the distal section of the trigger spring which in turn presses on the shutter release button lever of the inverted camera, to thereby automatically take the photographic picture at the moment of sudden impact.

Defined also alternatively broadly, the present invention is an impact activated camera triggering apparatus attachable to a vehicle in a position from which there is a view from the vehicle, the apparatus comprising: (a) a camera for taking a photographic picture and having a back side, a front side, a bottom side, a top side, a lens located on the front side and a shutter release lever located on the bottom side, the front side having an aperture; (b) a mounting element formed with the front side of the camera and having a base portion, a front portion, and a top portion, the base portion having a detent region with a cavity therethrough, the front portion having an opening therethrough for accommodating the field of view of the lens of the camera; (c) a seismic enclosure located below the lens and enclosing the detent region of the base portion of the mounting element; (d) a trigger spring installed within a cavity in the camera that does not enclose a film and located adjacent to the bottom side of the camera, the trigger spring having a distal end and a proximal end, where the proximal end is permanently fixed within the camera and the distal end is loaded and induces motion, when it is released; (e) a seismic mass limited to small movements essentially in a horizontal plane by the seismic enclosure and being able to move on the detent region and responsive to inertial forces; and (f) a trigger lever arm pivotally mounted within the mounting element at a location remote from the seismic mass and having a trigger lever pin extending down and resting on the seismic mass when the seismic mass is seated above the cavity of the detent region and a latching pin extending through the aperture of the front side of the camera, which loads the distal end of the trigger spring; (g) whereby the seismic mass can be moved off from the cavity of the detent region in response to the inertial forces upon sudden impact on the vehicle, which drops the trigger lever pin of the trigger lever arm off from the seismic mass, causing the latching pin of the trigger lever arm to release the distal end of the trigger spring which in turn presses on the shutter release lever of the camera, to thereby automatically take the photographic picture at the moment of sudden impact.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. In combination with a vehicle having at least one window surface and a camera having a lens and a shutter release button lever for taking a photographic picture, an impact activated camera triggering apparatus comprising:

a. a mounting element having a partial rear panel, a base panel and a front panel, the partial rear panel integrally formed with and upwardly extending from the base panel and having a top end terminating into a slanted flange protruding outwardly away from the mounting element, the base panel having a step-down section with a forward region and a rear region, the forward region having at least two apertures and a detent region with a cavity therethrough between the at least two apertures, the front panel having an opening therethrough for accommodating the field of view of said lens of said camera, where the front panel forms an upper flange section, a middle slanted section and a lower slanted section;

b. a divider including a forward extension section, a rearward extension section and a vertical extension section;

c. said forward extension section forming a top surface with an opening therethrough, a front surface with a pivot hole and two end surfaces which enclose said detent region of said mounting element with the opening on the top surface above said cavity of said detent region;

d. said rearward extension section covering said rear region of said step-down section of said base panel of said mounting element and having a cutout end opening;

e. said vertical extension section having an aperture and a dimpled pivot hole;

f. a trigger spring mounted within said rear region of said step-down section and having a tapering distal section with a narrow distal end, a wide middle section, and a tapering proximal section with a narrow proximal end, the proximal end located relative to said rearward extension section such that the middle section abuts against said base panel, and the distal end protruding out from said cutout end opening on said rearward extension section;

g. a rolling ball retained by said forward extension section and being able to roll on said detent region, where the rolling ball is limited to a horizontal plane movement and responsive to inertial forces;

h. a trigger lever arm pivotally mounted between said pivot hole of said front surface of said forward extension section and said dimpled pivot hole of said vertical extension section at a location remote from said rolling ball and having a distal end and a proximal end, the distal end forming a trigger lever pin extending down through said opening of said top surface of said forward extension section and resting on said rolling ball when said rolling ball is seated above said cavity of said detent region, the proximal end forming a reset trigger lever and resting above a respective one of said at least two apertures on said forward region of said base panel and a latching pin extending through said aperture of said vertical extension section for latching said distal end of said trigger spring;

i. said reset trigger lever of said trigger lever arm facilitating the cocking of said tapering distal section of said trigger spring by latching said latching pin of said trigger lever arm over said narrow distal end of said trigger spring to prevent said tapering distal section of said trigger spring from pressing up on said shutter release button lever of said camera prematurely;

j. an elongated rod having one end attached to said slanted flange of said rear panel and the other end extending upwardly above said camera;

k. an upper central suction cup attached to the other end of said elongated rod such that it adheres to said at least one window surface of the vehicle;

l. two separated lower suction cups attached to said middle slanted section of said front panel and opposite each other such that the two separated lower suction cups adhere to said at least one window surface of the vehicle; and m. means for retaining said camera when said camera is invertedly installed within said rear region of said mounting element;

n. whereby said rolling ball can be moved off from said cavity of said detent region in response to said inertial forces in the horizontal plane upon sudden impact on the vehicle from any lateral direction, which drops said trigger lever pin of said trigger lever arm off from said rolling ball, causing said latching pin of said trigger lever arm to release said tapering distal section of said trigger spring which in turn presses on said shutter release button lever of said camera, to thereby automatically take said photographic picture at the moment of sudden impact.

2. The apparatus in accordance with claim 1 wherein the sensitively can be adjusted by changing the weight of said rolling ball relative to the spring load.

3. The apparatus in accordance with claim 1 wherein the sensitively can be adjusted by changing the diameter of said cavity of said detent section relative to the diameter of said rolling ball.

4. The apparatus in accordance with claim 1 wherein the sensitivity can be adjusted by changing the horizontal projection of the length of said trigger lever arm from its pivot to said rolling ball relative to the distance between the pivot and the normal to said distal end of said trigger spring at said latching pin.

5. The apparatus in accordance with claim 1 wherein said camera can be readily removed from said mounting element for conventional manual operation.

6. The apparatus in accordance with claim 1 wherein said camera is a disposable wide-angle camera.

7. The apparatus in accordance with claim 1 wherein said means for retaining said camera when said camera is invertedly installed within said rear region of said mounting element comprises an elastic band having loops respectively extending through at least two clearance holes and looped over two opposite hook means on said vertical extension section of said divider and a third loop looped over a hook means on said partial rear panel of said mounting element, where the elastic band also rigidizes said mounting element by preloading it to said camera.

8. In combination with a vehicle having at least one window and a camera having a lens and a shutter release button lever for taking a photographic picture, an impact activated camera triggering apparatus comprising:

a. a mounting element having a rear panel, a base panel and a front panel, the rear panel having an upper flange, the base panel having a step-down section with a forward region and a rear region, the forward region having at least one aperture and a detent region with a cavity therethrough, the front panel having an opening therethrough for accommodating the field of view of said lens of said camera;

b. a divider including a forward extension, a rearward extension and a vertical extension, the forward extension forming a top surface with an opening, a front surface and two end surfaces which enclose said detent region, where the opening on the top surface is above said cavity of said detent region, the rearward extension covering said rear region of said step-down section and having a cutout end opening, the vertical extension having an aperture;

c. a trigger spring mounted within said rear region of said step-down section and having a distal section with a distal end, a middle section, and a proximal section with a proximal end, the proximal end located relative to said rearward extension such that the middle section abuts against said base panel, and the distal section being loaded;

d. a rolling mass retained by said forward extension of said divider and being able to roll on said detent region, where the rolling mass responds to inertial forces;

e. a trigger lever arm pivotally mounted between said front surface of said forward extension and said vertical extension of said divider at a location remote from said rolling mass and having a distal end and a proximal end, the distal end forming a trigger lever pin extending down through said opening of said top surface of said forward extension and resting on said rolling mass when said rolling mass is located over said cavity of said detent region, and the proximal end forming a reset trigger lever and a latching pin extending through said aperture of said vertical extension of said divider for loading said distal end of said trigger spring; and f. said reset trigger lever of said trigger lever arm facilitating the cocking of said distal section of said trigger spring by latching said latching pin of said trigger lever arm over said distal end of said trigger spring to prevent said distal section of said trigger spring from pressing up on said shutter release button lever of said camera prematurely;

g. a rod having one end attached to said top flange of said rear panel and the other end extending upwardly above said camera;

h. at least three suction cups attached to the other end of said rod and said front panel respectively such that the at least three suction cups adhere to said at least one window of the vehicle; and j. means for retaining said camera when said camera is installed within said rear region of said mounting element;

k. whereby said rolling mass can be moved off from said cavity of said detent region in response to said inertial forces in the horizontal plane upon sudden impact on the vehicle from any direction, which drops said trigger lever pin of said trigger lever arm off from said rolling mass, causing said latching pin of said trigger lever arm to release said distal section of said trigger spring which in turn presses on said shutter release button lever of said camera, to thereby automatically take said photographic picture at the moment of sudden impact.

9. The apparatus in accordance with claim 8 wherein the sensitively can be adjusted by changing the weight of said rolling mass relative to the spring load.

10. The apparatus in accordance with claim 8 wherein the sensitively can be adjusted by changing the diameter of said cavity of said detent section relative to the diameter of said rolling mass.

11. The apparatus in accordance with claim 8 wherein the sensitivity can be adjusted by changing the horizontal projection of the length of said trigger lever arm from its pivot to said rolling mass relative to the distance between the pivot and the normal to said distal end of said trigger spring at said latching pin.

12. The apparatus in accordance with claim 8 wherein said camera can be readily removed from said mounting element for conventional manual operation.

13. The apparatus in accordance with claim 8 wherein said means for retaining said camera when said camera is installed within said rear region of said mounting element comprises an elastic band having one end with loops respectively extending through holes in said front panel and looped over two retaining means on said vertical extension and the other end looped over a retaining means on said partial rear panel.

14. In combination with a vehicle having at least one window surface and a camera having a lens and a shutter release button lever for taking a photographic picture, an impact activated camera triggering apparatus comprising:

a. a mounting element having a partial rear panel, a base panel and a front panel, the partial rear panel integrally formed with and upwardly extending from the base panel, the base panel having a step-down section with a forward region and a rear region, the forward region having at least two apertures and a detent region with a cavity therethrough between the at least two apertures, the front panel having an opening therethrough for accommodating the field of view of said lens of said camera, where the front panel forms a slanted upper flange, a slanted middle section and a slanted lower section, the slanted middle section having two opposite cutout tabs being integrally attached at top ends to the lower slanted section and bendable in a backward or forward direction;

b. a divider including a forward extension section, a rearward extension section and a vertical extension section;

c. said forward extension section forming a top surface with an opening therethrough, a front surface with a pivot hole and two end surfaces which enclose said detent region of said mounting element with the opening on the top surface above said cavity of said detent region;

d. said rearward extension section covering said rear region of said step-down section of said base panel of said mounting element and having a cutout end opening;

e. said vertical extension section having an aperture and a dimpled pivot hole;

f. a trigger spring mounted within said rear region of said step down section and having a tapering distal section with a narrow distal end, a wide middle section, and a tapering proximal section with a narrow proximal end, the proximal end located relative to said rearward extension section such that the middle section abuts against said base panel, and the distal end located adjacent to said cutout end opening on said rearward extension section;

g. a rolling ball retained by said forward extension section and being able to roll on said detent region, where the rolling ball is limited to a horizontal plane movement and responsive to inertial forces;

h. a trigger lever arm pivotally mounted between said pivot hole of said front surface of said forward extension section and said dimpled pivot hole of said vertical extension section at a location remote from said rolling ball and having a distal end and a proximal end, the distal end forming a trigger lever pin extending down through said opening of said top surface of said forward extension section and resting on said rolling ball when said rolling ball is seated above said cavity of said detent region, the proximal end forming a reset trigger lever and resting above a respective one of said at least two apertures on said forward region of said base panel and a latching pin extending through said aperture of said vertical extension section for latching said distal end of said trigger spring;

i. said reset trigger lever of said trigger lever arm facilitating the cocking of said tapering distal section of said trigger spring by latching said latching pin of said trigger lever arm over said narrow distal end of said trigger spring to prevent said tapering distal section of said trigger spring from pressing up on said shutter release button lever of said camera prematurely;

j. two opposite slidable brackets slidably mounted on said slanted middle section of said front panel and adjustable in a backward or forward direction;

k. at least four suction cups each one respectively secured to said two opposite slidable brackets and said two cutout tabs of said front panel, where the at least four suction cups adhere to said at least one window surface of the vehicle; and l. means for retaining said camera when said camera is invertedly installed within said rear region of said mounting element;

m. whereby said rolling ball can be moved off from said cavity of said detent region in response to said inertial forces in the horizontal plane upon sudden impact on the vehicle from any lateral direction, which drops said trigger lever pin of said trigger lever arm off from said rolling ball, causing said latching pin of said trigger lever arm to release said tapering distal section of said trigger spring which in turn presses on said shutter release button lever of said camera, to thereby automatically take said photographic picture at the moment of sudden impact.

15. The apparatus in accordance with claim 14 wherein the sensitively can be adjusted by changing the weight of said rolling ball relative to the spring load.

16. The apparatus in accordance with claim 14 wherein the sensitively can be adjusted by changing the diameter of said cavity of said detent section relative to the diameter of said rolling ball.

17. The apparatus in accordance with claim 14 wherein the sensitivity can be adjusted by changing the horizontal projection of the length of said trigger lever arm from its pivot to said rolling ball relative to the distance between the pivot and the normal to said distal end of said trigger spring at said latching pin.

18. The apparatus in accordance with claim 14 wherein said camera can be readily removed from said mounting element for conventional manual operation.

19. The apparatus in accordance with claim 14 wherein said camera is a disposable wide-angle camera.

20. The apparatus in accordance with claim 14 wherein said means for retaining said camera when said camera is invertedly installed in said rear region of said mounting element comprises an elastic band having loops respectively looped over two opposite hook means on said vertical extension section of said divider and a hook means on said partial rear panel of said mounting element, where the elastic band also rigidizes the mounting element by preloading it to said camera.

21. In combination with a vehicle having at least one window and a camera having a lens and a shutter release button lever for taking a photographic picture, an impact activated camera triggering apparatus comprising:

a. a mounting element having a rear panel, a base panel and a front panel, the base panel having a step-down portion with a forward region and a rear region, the forward region having at least one aperture and a detent region with a cavity therethrough, the front panel having an opening therethrough for accommodating the field of view of said lens of said camera and at least two tabs being attached at their top ends and bendable in a backward or forward direction;

b. a divider including a forward extension, a rearward extension and a vertical extension, the forward extension forming a top surface with an opening, a front surface and two end surfaces which enclose said detent region, where the opening on the top surface is above said cavity of said detent region, the rearward extension covering said rear region of said step-down portion and having a cutout end opening, the vertical extension having an aperture;

c. a trigger spring mounted within of said rear region of said step-down portion and having a distal section with a distal end, a middle section and a proximal section with a proximal end, the proximal end located relative to said rearward extension such that the middle section abuts against said base panel, and the distal section being loaded;

d. a rolling mass retained by said forward extension of said divider and being able to roll on said detent region, where the rolling mass responds to inertial forces;

g. a trigger lever arm pivotally mounted between said front surface of said forward extension and said vertical extension of said divider at a location remote from said rolling mass and having a distal end and a proximal end, the distal end forming a trigger lever pin extending down through said opening of said top surface of said forward extension and resting on said rolling mass when said rolling mass is seated above said cavity of said detent region, the proximal end forming a reset trigger lever and resting above said at least one aperture on said base panel and a latching pin extending through said aperture on said vertical extension for latching said distal end of said trigger spring;

h. said reset trigger lever of said trigger lever arm facilitating the cocking of said distal section of said trigger spring by latching said latching pin of said trigger lever arm over said distal end of said trigger spring to prevent said distal section of said trigger spring from pressing up on said shutter release button lever of said camera prematurely;

i. at least two brackets slidably mounted on said front panel above said at least two tabs and slidably adjustable in a backward or forward direction;

j. at least four suction cups each one respectively secured to said at least two brackets and said at least two tabs, where the at least four suction cups adhere to said at least one window of the vehicle; and k. means for retaining said camera when said camera is installed in said rear region of said mounting element;

l. whereby said rolling mass can be moved off from said cavity of said detent region in response to said inertial forces upon sudden impact on the vehicle from any lateral direction, which drops said trigger lever pin of said trigger lever arm off from said rolling mass, causing said latching pin of said trigger lever arm to release said distal section of said trigger spring which in turn presses on said shutter release button lever of said camera, to thereby automatically take said photographic picture at the moment of sudden impact.

22. The apparatus in accordance with claim 21 wherein the sensitively can be adjusted by changing the weight of said rolling mass relative to the spring load.

23. The apparatus in accordance with claim 21 wherein the sensitively can be adjusted by changing the diameter of said cavity of said detent section relative to the diameter of said rolling mass.

24. The apparatus in accordance with claim 21 wherein the sensitivity can be adjusted by changing the horizontal projection of the length of said trigger lever arm from its pivot to said rolling mass relative to the distance between the pivot and the normal to said distal end of said trigger spring at said latching pin.

25. The apparatus in accordance with claim 21 wherein said camera can be readily removed from said mounting element for conventional manual operation.

26. The apparatus in accordance with claim 21 wherein said means for retaining said camera when said camera is installed within said rear region of said mounting element comprises an elastic band having one end attached to said vertical extension and the other end looped over a hook means on said rear panel, where the elastic band also rigidizes said mounting element by preloading it to said camera.

27. A triggering mechanism attachable to a vehicle in a position from which there is a view outside the vehicle for use with a visual image recording device having an element whose motion initiates operation, the triggering mechanism comprising:

a. a mounting element having at least one suction cup mounted and positioned on the mounting element for adhering to and maintaining the visual image recording device to the vehicle;

b. a seismic mass limited to small non-sliding movements essentially in a horizontal plane and responsive to inertial forces;

c. a trigger spring having a distal end and a proximal end, and being fixedly located relative to said mounting element, where the distal end is loaded and when the distal end is released it induces motion of said element whose motion initiates operation, and that motion initiates operation;

d. means for maintaining the position of said seismic mass relative to said mounting element in the absence of an acceleration in excess of a desired threshold value;

e. a trigger lever arm having a pivot axis, a distal end and a proximal end, the trigger lever arm pivoted about the pivot axis relative to said mounting element, the distal end forming a trigger lever pin resting on said seismic mass when said seismic mass is in the position in which it is maintained by said means for maintaining the position of said seismic mass, and the proximal end forming a latching pin, which loads said distal end of said trigger spring; and f. means for retaining said visual image recording device when said recording device is installed to the vehicle;

g. whereby in response to said acceleration in excess of the desired threshold induced by a sudden impact on the vehicle from any direction, said seismic mass is moved relative to said mounting element essentially in the horizontal plane from the position in which it is maintained by said means for maintaining the position of said seismic mass, which drops said trigger lever pin off from said seismic mass, allowing said trigger spring to rotate said trigger lever arm, causing said latching pin to release said distal end of said trigger spring, which moves said element of said visual image recording device that initiates operation of said visual image recording device, to thereby automatically record a visual image at the moment of sudden impact.

28. The apparatus in accordance with claim 27 wherein said means for retaining said visual image recording device when said recording device is installed to the vehicle comprises said mounting element being formed as part of said visual image recording device.

29. The apparatus in accordance with claim 27 wherein said means for retaining said visual image recording device when said recording device is installed to the vehicle comprises an elastic band.

30. A triggering mechanism attachable to a vehicle in a position from which there is a view outside the vehicle for use with a visual image recording device having an element whose motion initiates operation, the triggering mechanism comprising:

a. a seismic mass limited to small non-sliding movements essentially in a horizontal plane and responsive to inertial forces;

b. a trigger spring having a distal end and a proximal end, and being fixedly located relative to said visual image recording device, where the distal end is loaded and when the distal end is released it induces motion of said element, and the motion of said element initiates operation;

c. means for maintaining the position of said seismic mass in the absence of an acceleration in excess of a desired threshold value; and d. a trigger lever arm having a pivot axis, a distal end and a proximal end, the trigger lever arm pivoted about the pivot axis, the distal end forming a trigger lever pin resting on said seismic mass when said seismic mass is in the position in which it is maintained by said means for maintaining the position of said seismic mass, and the proximal end forming a latching pin, which loads said distal end of said trigger spring;

e. whereby in response to said acceleration in excess of the desired threshold induced by a sudden impact on the vehicle from any direction, said seismic mass is moved essentially in the horizontal plane from the position in which it is maintained by said means for maintaining the position of said seismic mass, which drops said trigger lever pin off from said seismic mass, allowing said trigger spring to rotate said trigger lever arm, causing said latching pin to release said distal end of said trigger spring, which moves said element of said visual image recording device that initiates operation of said visual image recording device, to thereby automatically record a visual image at the moment of sudden impact.

31. A triggering mechanism attachable to a vehicle in a position from which there is a view outside of the vehicle for use with a visual image recording device having an element whose motion initiates operation, the triggering mechanism comprising:

a. a seismic mass limited to small non-sliding movements essentially in a horizontal plane and responsive to inertial forces;

b. a trigger spring having a distal end and a proximal end, and being fixedly located relative to said visual image recording device, where the distal end is loaded and when the distal end is released it induces motion of said element, and the motion of said element initiates operation; and c. a trigger lever arm having a pivot axis, a distal end and a proximal end, the trigger lever arm pivoted about the pivot axis, the distal end forming a trigger lever pin resting on said seismic mass, and the proximal end forming a latching pin, which loads said distal end of said trigger spring;

d. whereby in response to an acceleration induced by a sudden impact on the vehicle from any direction, said seismic mass is moved essentially in the horizontal plane, which drops said trigger lever pin off from said seismic mass, allowing said trigger spring to rotate said trigger lever arm, causing said latching pin to release said distal end of said trigger spring, which moves said element of said visual image recording device that initiates operation of said visual image recording device, to thereby automatically record a visual image at the moment of sudden impact.

32. An impact activated camera triggering apparatus attachable to a vehicle in a position from which there is a view from the vehicle, the apparatus comprising:

a. an inverted camera for taking a photographic picture and having a back side, a front side, a bottom end, a top end, a lens located on the front side, and a shutter release button lever located on the bottom end, the front side having an aperture and a closed bottom pivot hole;

b. a mounting element integrally formed with said front side of said inverted camera and having a base portion, a slanted front portion, and a slanted top portion, the base portion having at least two apertures and a detent region with a cavity therethrough between the at least two apertures, the slanted front portion having an opening therethrough for accommodating the field of view of said lens of said inverted camera;

c. a seismic enclosure located below said lens and having a top surface with an opening therethrough, a front surface with a closed bottom pivot hole and two end surfaces, which enclose said detent region of said base portion of said mounting element, where the opening on the top surface is above said cavity of said detent region;

d. a trigger spring installed within a cavity of said inverted camera that does not enclose a film and located adjacent to said bottom side, the trigger spring having a distal section with a distal end and a proximal section with a proximal end, where the proximal end is permanently fixed;

e. a rolling ball retained by said seismic enclosure and being able to roll on said detent region, where the rolling ball is limited to a horizontal plane movement and responsive to inertial forces;

f. a trigger lever arm pivotally mounted between said pivot hole of said front surface of said seismic enclosure and said closed bottom pivot hole on said front side of said inverted camera at a location remote from said rolling ball and having a distal end and a proximal end, the distal end forming a trigger lever pin extending down through said opening of said top surface of said forward extension portion and resting on said rolling ball when said rolling ball is seated above said cavity of said detent region, the proximal end forming a reset trigger lever and resting above a respective one of said at least two apertures on said base portion and a latching pin extending through said aperture of said front side of said inverted camera for latching said distal end of said trigger spring;

g. said reset trigger lever of said trigger lever arm facilitating the cocking of said distal section of said trigger spring by latching said latching pin of said trigger lever arm above said distal end of said trigger spring to prevent said distal section of said trigger spring from pressing up on said shutter release button lever of said inverted camera prematurely;

h. a flange integrally formed with said back side of said inverted camera and protruding rearwardly and upwardly at an angle;

i. a rod having one end mounted to said flange of said back side of said camera and the other end extending upwardly above said top end of said inverted camera;

j. an upper suction cup attached to the other end of said rod such that it adheres to the vehicle;

k. two separated lower suction cups mounted to said slanted top portion of said mounting element and opposite each other such that the two separated lower suction cups adhere to the vehicle; and l. means for cocking said distal section of said trigger spring to prepare said apparatus to take a photographic picture;

m. whereby said rolling ball can be moved off from said cavity of said detent region in response to said inertial forces in the horizontal plane upon sudden impact on the vehicle from any lateral direction, which drops said trigger lever pin of said trigger lever arm off from said rolling ball, causing said latching pin of said trigger lever arm to release said distal section of said trigger spring which in turn presses on said shutter release button lever of said inverted camera, to thereby automatically take the photographic picture at the moment of sudden impact.

33. The apparatus in accordance with claim 32 wherein said means for cocking said distal section of said trigger spring to prepare said apparatus to take the photographic picture comprises a pendant attached to said distal end of said trigger spring, thereby pulling said distal end of said trigger spring to provide clearance for latching said latching pin of said trigger lever arm over said distal end of said trigger spring.

34. An impact activated camera triggering apparatus attachable to a vehicle in a position from which there is a view from the vehicle, the apparatus comprising:

a. a camera for taking a photographic picture and having a back side, a front side, a bottom side, a top side, a lens located on the front side and a shutter release lever located on the bottom side, the front side having an aperture;

b. a mounting element formed with said front side of said camera and having a base portion, a front portion, and a top portion, the base portion having a detent region with a cavity therethrough, the front portion having an opening therethrough for accommodating the field of view of said lens of said camera;

c. a seismic enclosure located below said lens and enclosing said detent region of said base portion of said mounting element;

d. a trigger spring installed within a cavity in said camera that does not enclose a film and located adjacent to said bottom side of said camera, the trigger spring having a distal end and a proximal end, where the proximal end is permanently fixed within said camera and the distal end is loaded and induces motion, when it is released;

e. a seismic mass limited to small movements essentially in a horizontal plane by said seismic enclosure and being able to move on said detent region and responsive to inertial forces; and f. a trigger lever arm pivotally mounted within said mounting element at a location remote from said seismic mass and having a trigger lever pin extending down and resting on said seismic mass when said seismic mass is seated above said cavity of said detent region and a latching pin extending through said aperture of said front side of said camera, which loads said distal end of said trigger spring;

g. whereby said seismic mass can be moved off from said cavity of said detent region in response to the inertial forces upon sudden impact on the vehicle, which drops said trigger lever pin of said trigger lever arm off from said seismic mass, causing said latching pin of said trigger lever arm to release said distal end of said trigger spring which in turn presses on said shutter release lever of said camera, to thereby automatically take the photographic picture at the moment of sudden impact.

35. The apparatus in accordance with claim 34 further comprising means for cocking said distal end of said trigger spring to prepare said apparatus to take the photographic picture.

36. The apparatus in accordance with claim 35 wherein said means for cocking said distal end of said trigger spring to prepare said apparatus to take the photographic picture comprises a pendant attached to said distal end of said trigger spring, and thereby pulling said distal end of said trigger spring to provide clearance for latching said latching pin of said trigger lever arm above said distal end of said trigger spring.

37. The apparatus in accordance with claim 34 further comprising a flange integrally formed with said back side of said camera and protruding rearwardly and upwardly at an angle.

38. The apparatus in accordance with claim 37 further comprising a rod having one end mounted to said flange of said back side of said camera and the other end extending upwardly above said top side of said camera.

39. The apparatus in accordance with claim 38 further comprising an upper suction cup attached to the other end of said rod such that it adheres to the vehicle.

40. The apparatus in accordance with claim 34 further comprising at least two lower suction cups mounted to said top portion of said mounting element and opposite each other such that the at least two lower suction cups adhere to the vehicle.

* * * * *